United States Patent
Funabiki et al.

(10) Patent No.: US 8,130,684 B2
(45) Date of Patent: Mar. 6, 2012

(54) WIRELESS COMMUNICATION SYSTEM FOR WIRELESSLY TRANSMITTING AND RECEIVING CEC MESSAGE

(75) Inventors: Makoto Funabiki, Osaka (JP); Akihiro Tatsuta, Kyoto (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 762 days.

(21) Appl. No.: 12/278,853

(22) PCT Filed: Feb. 13, 2007

(86) PCT No.: PCT/JP2007/052494
§ 371 (c)(1),
(2), (4) Date: Dec. 3, 2008

(87) PCT Pub. No.: WO2007/091706
PCT Pub. Date: Aug. 16, 2007

(65) Prior Publication Data
US 2010/0165912 A1 Jul. 1, 2010

(30) Foreign Application Priority Data
Feb. 10, 2006 (JP) .................................. 2006-033535

(51) Int. Cl.
*H04B 7/00* (2006.01)
(52) U.S. Cl. .......................... 370/310; 370/338; 709/238
(58) Field of Classification Search .................. None
See application file for complete search history.

(56) References Cited

U.S. PATENT DOCUMENTS

| | | |
|---|---|---|
| 2003/0223377 A1 | 12/2003 | Simmons et al. |
| 2004/0143847 A1 | 7/2004 | Suzuki et al. |
| 2005/0223411 A1* | 10/2005 | Jung et al. ..................... 725/135 |
| 2006/0209890 A1* | 9/2006 | MacMullan et al. .......... 370/468 |
| 2008/0270632 A1* | 10/2008 | Hong et al. ........................ 710/4 |
| 2009/0051565 A1* | 2/2009 | Yung et al. ............... 340/825.22 |
| 2009/0077492 A1* | 3/2009 | Ida ................................. 715/810 |
| 2009/0141180 A1* | 6/2009 | Kondo et al. .................. 348/723 |
| 2009/0285138 A1* | 11/2009 | Thomas et al. ............... 370/310 |

FOREIGN PATENT DOCUMENTS

| | | |
|---|---|---|
| JP | 5-114879 | 5/1993 |
| JP | 2001-057690 | 2/2001 |

(Continued)

OTHER PUBLICATIONS

International Search Report issued Mar. 20, 2007 in the International (PCT) Application of which the present application is the U.S. National Stage.

(Continued)

*Primary Examiner* — Chirag Shah
*Assistant Examiner* — Otis L Thompson, Jr.
(74) *Attorney, Agent, or Firm* — Wenderoth, Lind & Ponack, L.L.P.

(57) ABSTRACT

In a wireless communication system including a source device and a sink device for wirelessly transmitting and receiving a CEC message specified in an HDMI standard, a CEC controller of the source device generates and outputs a CEC frame including the CEC message. A controller generates a wireless data packet including the CEC message in the generated CEC frame. A wireless transceiver circuit wirelessly transmits a wireless signal including the generated wireless data packet to the sink device, and receives a wireless signal including a wireless ACK packet and wirelessly transmitted from the sink device in response to the wireless data packet in the wirelessly-transmitted wireless signal.

23 Claims, 16 Drawing Sheets

FOREIGN PATENT DOCUMENTS

| | | |
|---|---|---|
| JP | 2004-208290 | 7/2004 |
| JP | 2005-244474 | 9/2005 |
| JP | 2005-528853 | 9/2005 |
| JP | 2006-013761 | 1/2006 |

OTHER PUBLICATIONS

"High-Definition Multimedia Interface Specification Version 1.1", HDMI Licensing, LLC, California, U.S.A., May 20, 2004.

* cited by examiner

Fig.2

NODE INFORMATION TABLE 12b

| CEC LOGICAL ADDRESS | CEC PHYSICAL ADDRESS | WIRELESS DEVICE ID |
|---|---|---|
| 0 | 0. 0. 0. 0 | 1 |
| 1 | 1. 0. 0. 0 | 2 |
| 3 | 2. 0. 0. 0 | 3 |
| 4 | 3. 0. 0. 0 | 4 |
| ... | ... | ... |

Fig.3

TRANSMITTED DATA INFORMATION TABLE 12a

| SENDER LOGICAL ADDRESS | DESTINATION LOGICAL ADDRESS | TRANSMITTED DATA | ACK RECEPTION STATUS |
|---|---|---|---|
| 0 | 2 | ABC | 1 |
| 1 | 3 | EDF | 0 |
| ... | ... | ... | ... |

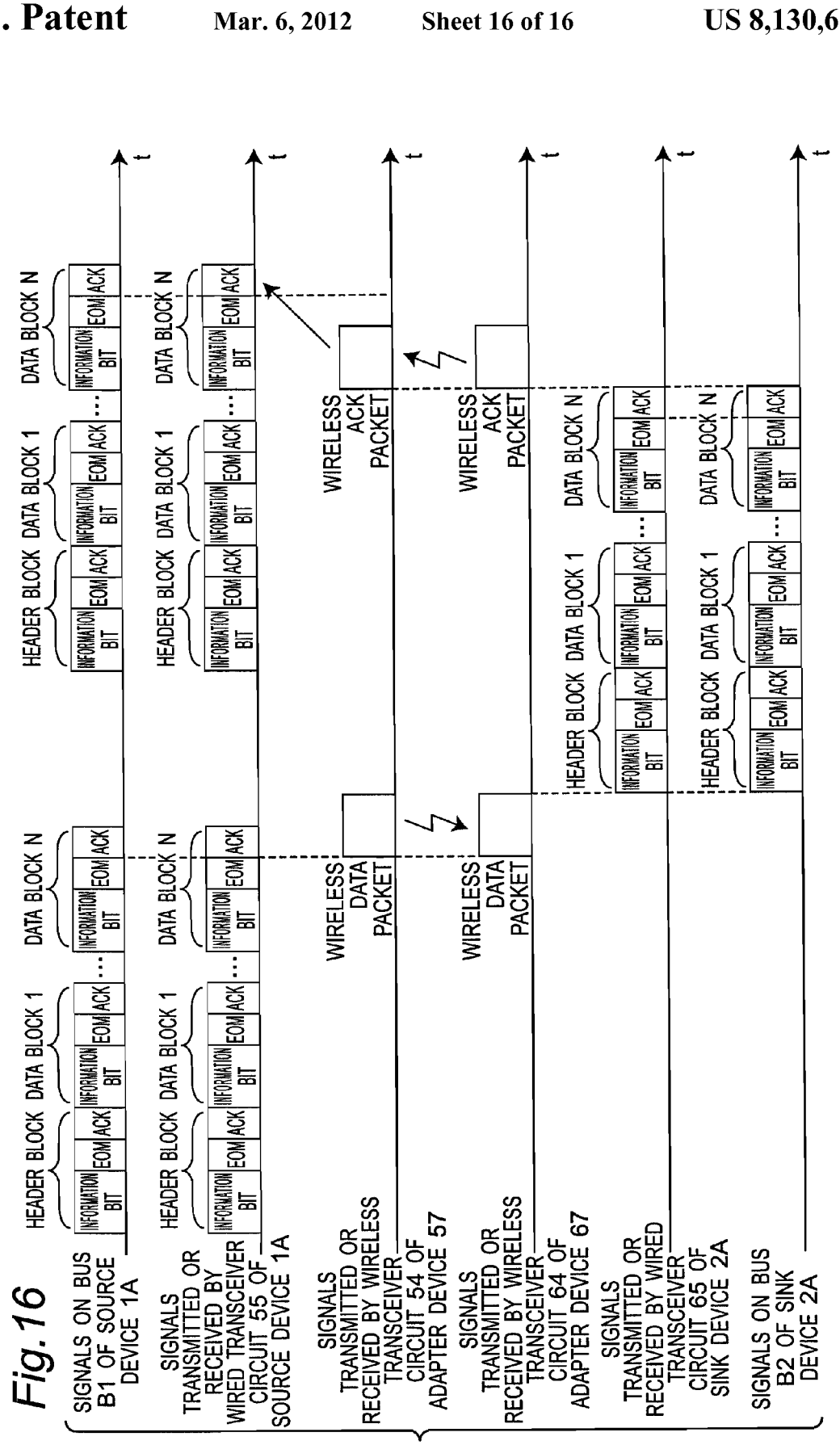

WIRELESS COMMUNICATION SYSTEM FOR WIRELESSLY TRANSMITTING AND RECEIVING CEC MESSAGE

TECHNICAL FIELD

The present invention relates to a wireless communication device, a wireless communication system, and a method of controlling the wireless communication device for wirelessly communicating a CEC (Consumer Electronics Control) message specified in an HDMI (High-Definition Multimedia Interface) standard.

BACKGROUND ART

Patent Document 1 discloses a technique for wirelessly transmitting the CEC message specified in the HDMI standard. The Patent Document 1 discloses a method of determining a topology of a network including a master node and one or more slave nodes interconnected to each other using one-way data connection. The master node enables a node subsequent to the master node to use data, and each of the slave nodes reads data from a previous node. The read data includes information on a path from the master node to the slave node. There is disclosed an additional method of configuring a path by transmitting data from a slave node to all the nodes on a path via two-way data connection between the nodes. In a preferred embodiment, a home entertainment system using the HDMI is an appropriate network, and the network includes a presentation component (e.g., a television receiver) operable to function as a master node. In this case, the network nodes are connected to each other so as to set an HDMI code. The HDMI standard includes a DDC bus corresponding to the one-way data connection, and a CEC bus corresponding to the two-way data connection.

Patent Document 1: Japanese patent laid-open publication No. JP-2005-528853-A.

Non-Patent Document 1: High-Definition Multimedia Interface Specification, Version 1.1, HDMI Licensing, LLC, California in U.S.A., May 20, 2004.

DISCLOSURE OF THE INVENTION

Problems to be Solved by the Invention

However, the technique according to the prior art has the following problems. When a wireless communication device at sender-side and a wireless communication device at receiver-side are connected to each other via a wired connection in order to transmit a CEC message, this leads to pell-mell wirings in appearance. In addition, only one wireless communication device can receive the CEC message from one wireless communication device of sender-side per one wiring. Each time one of the other wireless communication devices receives the CEC message, the cables should be removed from one wireless communication devices, and be connected to another wireless communication devices, and this requires a tremendous labor.

An essential object of the present invention is to provide a wireless communication device, a wireless communication system, and a method of controlling the wireless communication device, each capable of solving the above-stated problems, making simple appearance without using any cables for transmitting and receiving the CEC message, and making it possible to easily transmit the CEC message from one wireless communication device to a plurality of wireless communication devices.

Means for Solving the Problems

A wireless communication device according to a first invention is a wireless communication device of a first wireless communication device for use in a wireless communication system. The wireless communication system is characterized by including a plurality of wireless communication devices for transmitting and receiving a CEC message specified in an HDMI standard, and the wireless communication devices includes the first wireless communication device and a second wireless communication device. The first wireless communication device includes CEC controller means for generating and outputting a CEC frame including a CEC message, controller means for generating a wireless data packet including the CEC message in the generated CEC frame, and wireless transceiver means. In this case, the wireless transceiver means wirelessly transmits a wireless signal including the generated wireless data packet to the second wireless communication device, and receives a wireless signal including a wireless receiving response packet and wirelessly transmitted from the second wireless communication device in response to the wireless data packet in the wirelessly-transmitted wireless signal.

In the above-mentioned wireless communication device, the CEC controller means and the controller means may be connected to each other via an internal bus.

In addition, in the above-mentioned wireless communication device, the CEC controller means and the controller means may be connected to each other via an internal bus and a wired connection.

Further, in the above-mentioned wireless communication device, upon receiving the wireless receiving response packet from the second wireless communication device within a predetermined time interval, the controller means may output a predetermined acknowledge signal to the CEC controller means, and upon not receiving the wireless receiving response packet in response to the wireless data packet from the second wireless communication device within a predetermined time interval, the first wireless communication device may stop outputting the acknowledge signal to the CEC controller means. In this case, in the above-mentioned wireless communication device, upon not detecting the acknowledge signal from the controller means within a predetermined time interval after outputting the CEC frame, the CEC controller means may re-output the CEC frame, and upon inputting the re-outputted CEC frame from the CEC controller means, when the wireless receiving response packet in response to the wireless data packet has already been received, the controller means may stop wirelessly transmitting the wireless data packet and outputs the acknowledge signal to the CEC controller means. Further, in this case, the above-mentioned wireless communication may further comprises storage means for associating (a) at least a part of the CEC frame in the wireless data packet and (b) a receiving status indicating whether or not the wireless response receiving packet in response to the wireless data packet has been received, and for storing the part of the CEC frame in the wireless data packet and the receiving status in a transmitted data information table. In this case, when the controller means wirelessly transmits the wireless signal including the wireless data packet, the controller means may store at least the part of the CEC frame in the wireless data packet in the transmitted data information table, and upon wirelessly receiving the wireless response receiving packet, the controller means may store the receiving status indicating that the wireless response receiving packet in response to the wireless data packet has been received.

Alternatively, upon inputting the CEC frame generated by the CEC controller means, the controller means may output a predetermined acknowledge signal to the CEC controller means.

Still further, in the above-mentioned wireless communication device the CEC frame may include at least one block having a predetermined format, the controller means may output the acknowledge signal to the CEC controller means when the block is not a last block, and the controller means wirelessly may transmit the wireless data packet when the block is the last block.

In addition in the above-mentioned wireless communication device, upon receiving the wireless signal of the wireless receiving response packet wirelessly transmitted from the second wireless communication device, the controller means may set a sender logical address of the second wireless communication device included in a CEC frame in the wireless receiving response packet as a CEC logical address, set a sender device ID in the wireless receiving response packet as a wireless device ID, associates the CEC logical address and the wireless device ID with each other as a pair, allocate a CEC physical address to the associated pair, and thereafter store the CEC physical address and a corresponding pair in the storage means as a node information table.

A wireless communication system according to a second invention is characterized by comprising a plurality of above-mentioned wireless communication devices.

A method of controlling a wireless communication device according to a third invention is a method of controlling a wireless communication device of a first wireless communication device for a wireless communication system. In this case, the wireless communication system includes a plurality of wireless communication devices for transmitting and receiving a CEC message specified in an HDMI standard. The wireless communication devices include the first wireless communication device and a second wireless communication device. The method is characterized by including the following steps of generating and outputting a CEC frame including a CEC message, generating a wireless data packet including the CEC message in the generated CEC frame, and wirelessly transmitting a wireless signal including the generated wireless data packet to the second wireless communication device, and receiving a wireless signal including a wireless receiving response packet and wirelessly transmitted from the second wireless communication device in response to the wireless data packet in the wirelessly-transmitted wireless signal.

The above-mentioned method of controlling the wireless communication may further include the following steps of upon receiving the wireless receiving response packet from the second wireless communication device within a predetermined time interval, outputting a predetermined acknowledge signal, and upon not receiving the wireless receiving response packet in response to the wireless data packet from the second wireless communication device within a predetermined time interval, stopping outputting the acknowledge signal. In this case, the above-mentioned method of controlling the wireless communication device may further includes the following steps of upon not detecting the acknowledge signal from the controller means within a predetermined time interval after outputting the CEC frame, re-outputting the CEC frame, upon inputting the re-outputted CEC frame, when the wireless receiving response packet in response to the wireless data packet has already been received, stopping wirelessly transmitting the wireless data packet and outputting the acknowledge signal.

Effects of the Invention

Accordingly, the wireless communication device, the wireless communication system, and the method of controlling a wireless communication device according to the present invention can exhibit such an advantageous effect that the simple appearance can be made by eliminating wirings for transmitting and receiving the CEC message, and such an advantageous effect that it is made possible to easily transmit the CEC message from one wireless communication device to a plurality of wireless communication devices without any changes in the cable connections, by wirelessly communicating the CEC message.

In addition, the CEC controller means and the controller means are connected to each other via the internal bus and the wired connection. Due to this, a wireless transmitter device including only a wired interface for transmitting and receiving the CEC message can wirelessly transmit and receive a CEC frame.

BRIEF DESCRIPTION OF THE DRAWINGS

FIG. 2 is a table showing an example of a node information table 12b stored in a ROM 11 of FIG. 1.

FIG. 3 is a table showing an example of a transmitted data information table 12a stored in a RAM 12 of FIG. 1.

FIG. 16 is a sequence diagram showing signals of respective parts of the wireless communication system of FIG. 15.

Figure 1:
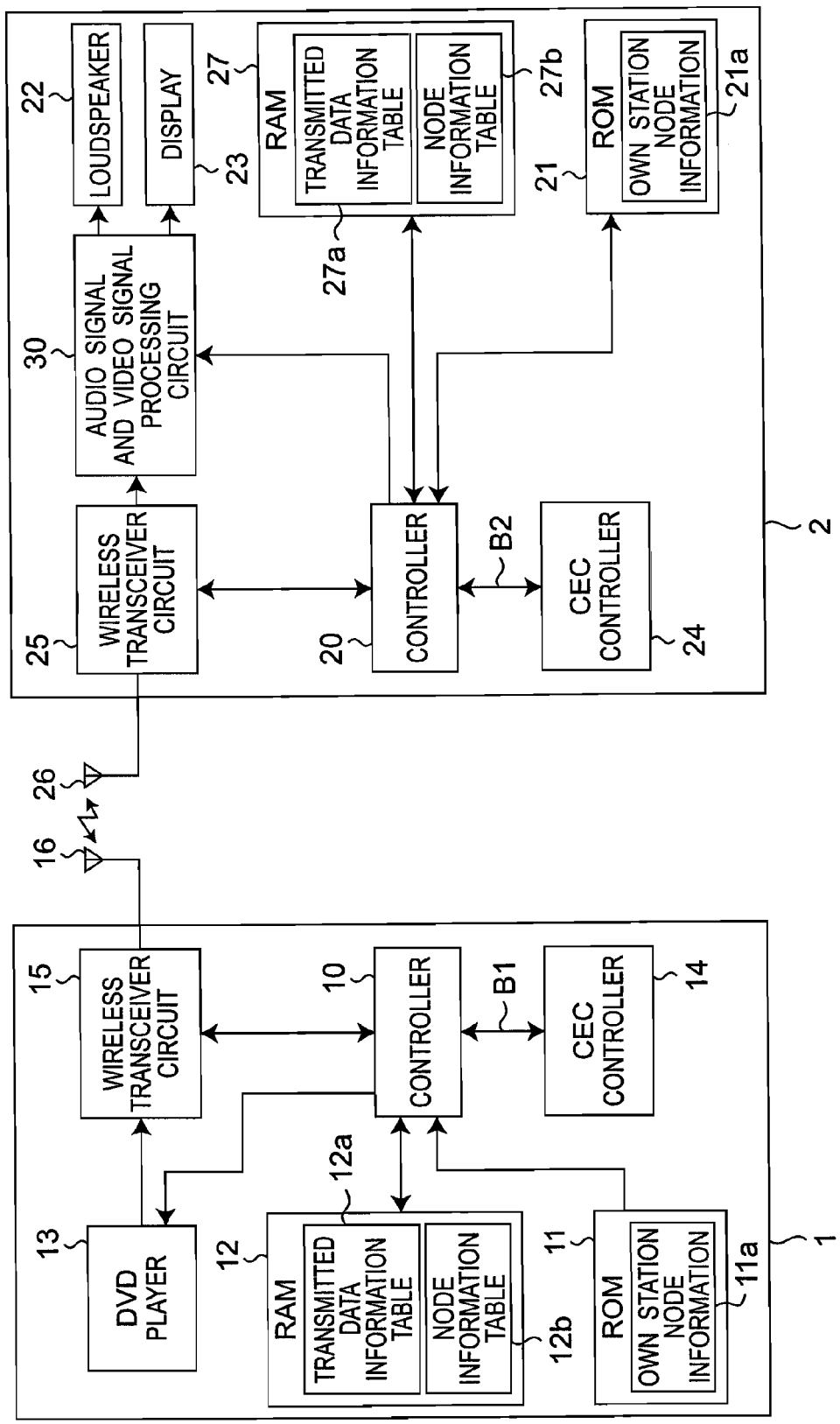
FIG. 1 is a block diagram showing a configuration of a wireless communication system according to a first embodiment of the present invention.

DESCRIPTION OF REFERENCE SYMBOLS 1 and 1A ... Source device,
2 and 2A ... Sink device,
10, 20, 10A, 20A, 50 and 60 ... Controller,
11 and 21 ... ROM,
11a and 21a ... Own station node information,
12, 27, 52 and 62 ... RAM,
12a, 27a, 52a and 62a ... Transmitted data information table,
12b, 27b, 52b and 62b ... Node information table,
13 ... DVD player,
14 and 24 ... CEC controller,
15, 25, 54 and 64 ... Wireless transceiver circuit,
16, 26, 56 and 66 ... Antenna,
22 ... Loudspeaker,
23 ... Display,
30 ... Audio signal and video signal processing circuit,
51, 55, 61 and 65 ... Wired transceiver circuit,
57 and 67 ... Adapter device.

BEST MODE FOR CARRYING OUT THE INVENTION

Embodiments according to the present invention will be described hereinafter with reference to the drawings. Components similar to each other are denoted by the same reference numerals.

First Embodiment

FIG. 1 is a block diagram showing a configuration of a wireless communication system according to a first embodiment of the present invention. Referring to FIG. 1, the wireless communication system according to the present embodiment includes a source device 1 and a sink device 2. The source device 1 is configured to include a controller 10, a read only memory (referred to as a ROM hereinafter) 11, a random access memory (referred to as a RAM hereinafter) 12, a DVD player 13, a CEC controller 14, a wireless transceiver circuit 15, and an antenna 16. The sink device 2 is configured to include a controller 20, a ROM 21, a loudspeaker 22, a display 23, a CEC controller 24, a wireless transceiver circuit 25, an antenna 26, a RAM 27, and an audio signal and video signal processing circuit 30.

In the source device 1 of FIG. 1, the DVD player 13 reads out a video signal and an audio signal recorded in a recording medium such as a DVD, and outputs the video signal and the audio signal to the wireless transceiver circuit 15 according to control of the controller 10. The ROM 11 stores own station node information 11a including an own station logical address of the source device 1 and an own station device ID of, for example, a MAC address of the source device 1. The RAM 12 stores a transmitted data information table 12a (to be described later with reference to FIG. 3) and a node information table 12b (to be described later with reference to FIG. 2). In this case, the transmitted data information table 12a includes transmitted data information on a CEC (Consumer Electronics Control) frame including a CEC message transmitted or received via the antenna 16. The node information table 12b (to be described later with reference to FIG. 2) includes node information such as physical addresses, logical addresses, and device IDs of respective devices, e.g., the source device 1 and the sink device 2, constituting the wireless communication system. The CEC controller 14 has a bus interface to connect to a bus B1, and generates a CEC frame specified in an HDMI (High-Definition Multimedia Interface) standard based on the node information read out from the node information table 12b via the controller 10, and outputs the generated CEC frame to the controller 10 via the internal bus (referred to as a bus hereinafter) B1. In addition, the CEC controller 14 receives an ACK signal outputted from the controller 10 and a CEC frame transmitted from the sink device 2 via the wireless transceiver circuit 15 and the controller 10, and executes a predetermined operation according to a control code of a CEC message included in the CEC frame. The CEC frame is continuously outputted from the CEC controller 14 to the controller 10 via the bus B1 as a pulse waveform indicating "0" or "1".

The wireless transceiver circuit 15 encodes the video signal and the audio signal read out by the DVD player 13, generates a transmitting packet, generates a wireless AV signal by modulating a carrier wave having a frequency within a band such as a millimeter waveband, and a microwave band according to the generated transmitting packet, and transmits the wireless AV signal to the sink device 2 via the antenna 16. In addition, the wireless transceiver circuit 15 encodes a wireless data packet outputted from the controller 10, generates a wireless data signal by modulating a carrier wave having a frequency within a band such as the millimeter waveband and the microwave band according to the wireless data packet, and transmits the generated wireless data signal to the sink device 2 via the antenna 16. In addition, the wireless transceiver circuit 15 receives a wireless data signal having a predetermined frequency from the sink device 2 via the antenna 16, performs a frequency conversion process and a decoding process on the wireless data signal, and outputs the processed data signal to the controller 10. The controller 10 includes an interface to connected to the bus B1, generates the wireless data packet including the CEC frame inputted from the CEC controller 14 via the bus B1, and outputs the generated wireless data packet to the wireless transceiver circuit 15. Further, the controller 10 stores the transmitted data information (to be described later with reference to FIG. 3) on the outputted CEC frame in the transmitted data information table 12a of the RAM 12. In addition, the controller 10 performs a received packet process on a data signal received from the sink device 2 via the antenna 16 and the wireless transceiver circuit 15, and executes an address information registration process and a data transmission and receiving process (to be described later with reference to FIGS. 7 and 8) based on the generated wireless data packet.

In the sink device 2, the wireless transceiver circuit 25 performs a frequency conversion process, a received packet process, and a decoding process on the wireless AV signal received via the antenna 26, and thereafter outputs an AV signal including a processed video signal and an audio signal to the audio signal and video signal processing circuit 30. Further, the wireless transceiver circuit 25 performs a frequency conversion process and a decoding process on the wireless data signal received via the antenna 2, and outputs the processed data signal to the controller 20. In addition, the wireless transceiver circuit 25 encodes a wireless data packet outputted from the controller 20, generates a wireless data signal by modulating a carrier wave having a predetermined frequency according to the wireless data packet, and transmits the generated wireless data signal to the source device 1 via the antenna 26. The ROM 21 is configured in a manner similar to that of the ROM 11 of the source device 1, stores own node information 21a including an own station logical address and an own station device ID of the sink device 2. The RAM 27 is configured in a manner similar to that of the RAM 12 of the source device 1, stores a transmitted data information table 27a and a node information table 27b. The controller 20 and the CEC controller 24 are configured in a manner similar to that of the controller 10 and the CEC controller 14 of the source device 1, respectively. However, the controller 20 and the CEC controller 24 are connected to each other via a bus B2 instead of the bus B1, and include bus interfaces to connect to the bus B2, respectively. The controller 20 controls the audio signal and video signal processing circuit 30 instead of the DVD player 13. The audio signal and video signal processing circuit 30 separates the processed AV signal outputted from the wireless transceiver circuit 25 into a video signal and an audio signal, outputs the video signal to the display 23 to display the video signal thereon, and outputs the audio signal to the loudspeaker 22.

FIG. 2 is a table showing an example of the node information table 12*b* stored in the RAM 12 of FIG. 1. The node information table 12*b* of FIG. 2 stores CEC logical addresses, CEC physical addresses, and wireless device IDs so that the CEC logical addresses, CEC physical addresses, and wireless device IDs correspond to each other. The CEC physical addresses are four-digit numeric values uniquely allocated to the source device 1 itself and the other wireless communication devices such as the sink device 2 wirelessly connected to the source device 1, respectively, in the source device 1 for transmitting and receiving a CEC frame. For example, in FIG. 2, CEC physical address "0.0.0.0" is allocated to the source device 1 itself, and CEC physical addresses "1.0.0.0", "2.0.0.0", "3.0.0.0" . . . are sequentially allocated to the other wireless communication devices, on which the source device 1 has performed an address registration process, respectively. In addition, when the source device 1 connects to the other wireless communication devices via the wireless communication device having the CEC physical address "1.0.0.0", CEC physical addresses "1.1.0.0", "1.2.0.0", "1.3.0.0" . . . are allocated to the other wireless communication devices in sequence, respectively. The CEC physical addresses of FIG. 2 include the CEC physical address allocated to the source device 1, and the CEC physical addressed allocated to the other wireless communication devices wirelessly connected to the source device 1, respectively. Wireless device IDs of FIG. 2 include device IDs, e.g., MAC addresses of the source device 1 and the other wireless communication devices wirelessly connected to the source device 1. In the present embodiment, the node information table 12*b* includes both of the CEC logical addresses and the CEC physical addresses. Alternatively, the node information table 12*b* may be configured to include either the CEC logical addresses or the CEC physical addresses.

FIG. 3 is a table showing an example of the transmitted data information table 12*a* stored in the RAM 12 of FIG. 1. The transmitted data information table 12*a* of FIG. 3 stores sender logical addresses indicating sender wireless communication devices for transmitting CEC frames, destination logical addresses indicating destination wireless communication devices for receiving the CEC frames, transmitted data, and ACK receiving statuses indicating whether or not ACK signals have been received in response to the respective CEC frames, so that the sender logical addresses, destination logical addresses, transmitted data and the ACK receiving statuses correspond to each other. In the present embodiment, for example, the ACK receiving status "1" indicates that an ACK signal in response to a CEC frame has not been received yet. The ACK receiving status "0" indicates that an ACK signal in response to a CEC frame has been received.

Figure 4:
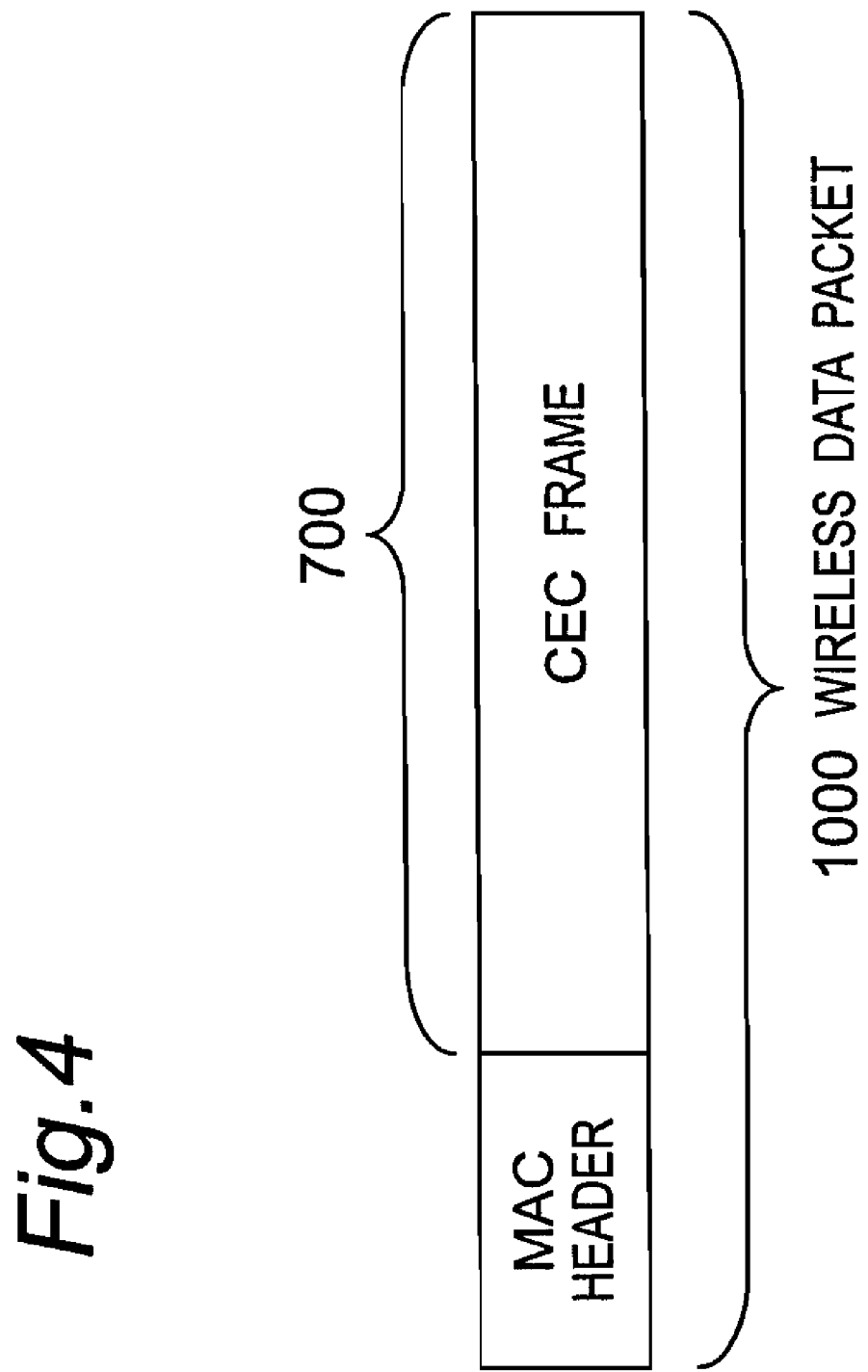
FIG. 4 is a configuration diagram showing an example of a format of a wireless data packet 1000.

FIG. 4 is a configuration diagram showing an example of a format of a wireless data packet 1000. Referring to FIG. 4, the wireless data packet 1000 includes a MAC header region and a CEC frame region 700. The MAC header region includes a destination device ID and a sender device ID. In this case, the destination device ID is a device ID of a destination wireless communication device which is to receive the wireless data packet 1000, and the sender device ID is a device ID of a sender wireless communication device which is to transmit the wireless data packet 1000. The CEC frame region 700 includes the CEC frame generated by the CEC controller 14 or 24. Alternatively, the CEC frame region may include only a part of the CEC frame generated by the CEC controller 14 or 24.

Figure 5:
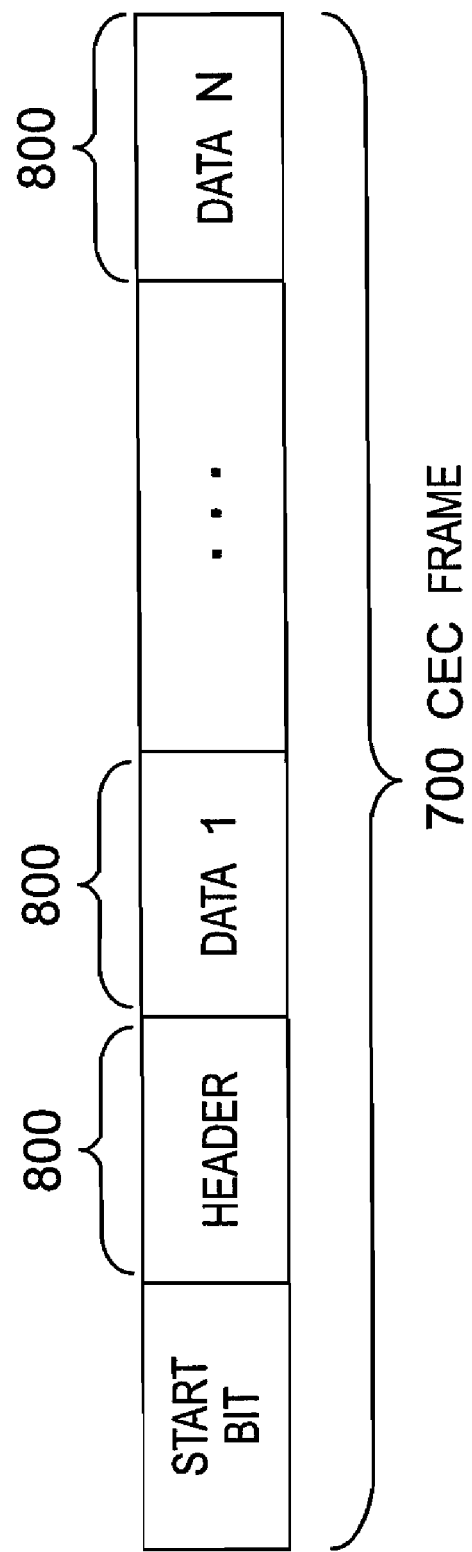
FIG. 5 is a configuration diagram showing an example of a format of a CEC frame region 700 of FIG. 4.

FIG. 5 is a configuration diagram showing an example of a format of the CEC frame region 700 of FIG. 4. Referring to FIG. 5, the CEC frame region 700 includes a start bit of one-bit, a header block 800, and N (where N is an integer) data blocks 800 subsequent to the header block. The start bit indicates a start of the CEC frame and has a predetermined pulse wave pattern. A receiver-side wireless communication device detects that the wireless data packet includes a CEC frame by detecting the start bit, and can receive the subsequent header block and data blocks 800 by sampling the pulse wave pattern with a predetermined time cycle from the timing at which the start bit was detected. The header block and data blocks 800 are configured in manners similar to each other as described later with reference to FIG. 6.

Figure 6:
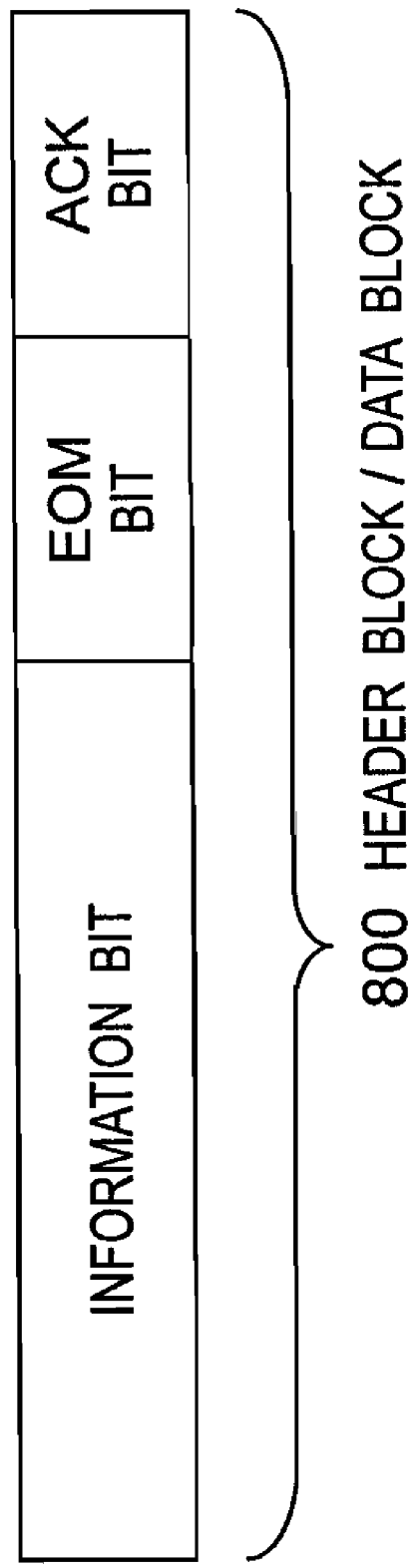
FIG. 6 is a configuration diagram showing an example of a format of each of a header block and data blocks 800 of FIG. 4.

FIG. 6 is a configuration diagram showing an example of a format of each of the header block and the data blocks 800 of FIG. 5. Referring to FIG. 6, each of the header block and the data blocks 800 includes an information bit region of eight-bit, an EOM (End of Message) bit of one-bit, and an ACK (Acknowledge) bit of one-bit. In the header block, the information bit region stores a four-bit sender logical address indicating the logical address of the sender wireless communication device which is to transmit a CEC frame, and a four-bit destination logical address indicating the logical address of the destination wireless communication device which is to receive the CEC frame. In each of the data blocks, the information bit region stores a control code or the like for instructing the destination wireless communication device, to which the CEC frame is to be transmitted, to perform a predetermined operation. When the header block or each of the data blocks is a last block of the CEC frame, the EOM bit is set to "1", otherwise, the EOM bit is set to "0". In addition, the ACK bit is always set to "1" in a transmission buffer for the bus interface by the CEC controller 14 or 24 which generates the CEC frame. When the EOM bit is "0", the ACK bit is set to "0" by the controller 10 or 20 which has recognized the information bit region and the EOM bit. When the EOM bit is "1", upon receiving a wireless ACK packet in response to the wireless data packet from the sink device 2, the ACK bit is set to "0" by the controller 10 or 20. The CEC controller 14 or 24 samples the ACK bit in the transmission buffer after a lapse of a predetermined time interval (e.g., 2.4 milliseconds) after outputting the EOM bit, and recognizes that transmission of the block or the CEC frame has been failed when the ACK bit remains the initial value of "1".

The operations performed by the wireless communication system configured as stated above will be described with reference to FIGS. 7, 8, 9, and 10. Referring to FIGS. 7 to 10, such a case will be described by way of example that the source device 1 registers address information on the sink device 2, the source device 1 transmits a CEC frame to the sink device 2, and the sink device 2 receives the CEC frame from the source device 1. However, the present invention is not limited to this operation, and an inverse operation may be performed. Namely, the sink device 2 may transmit a CEC frame to the source device 1, and the source device 1 may receive the CEC frame from the sink device 2.

Figure 7:
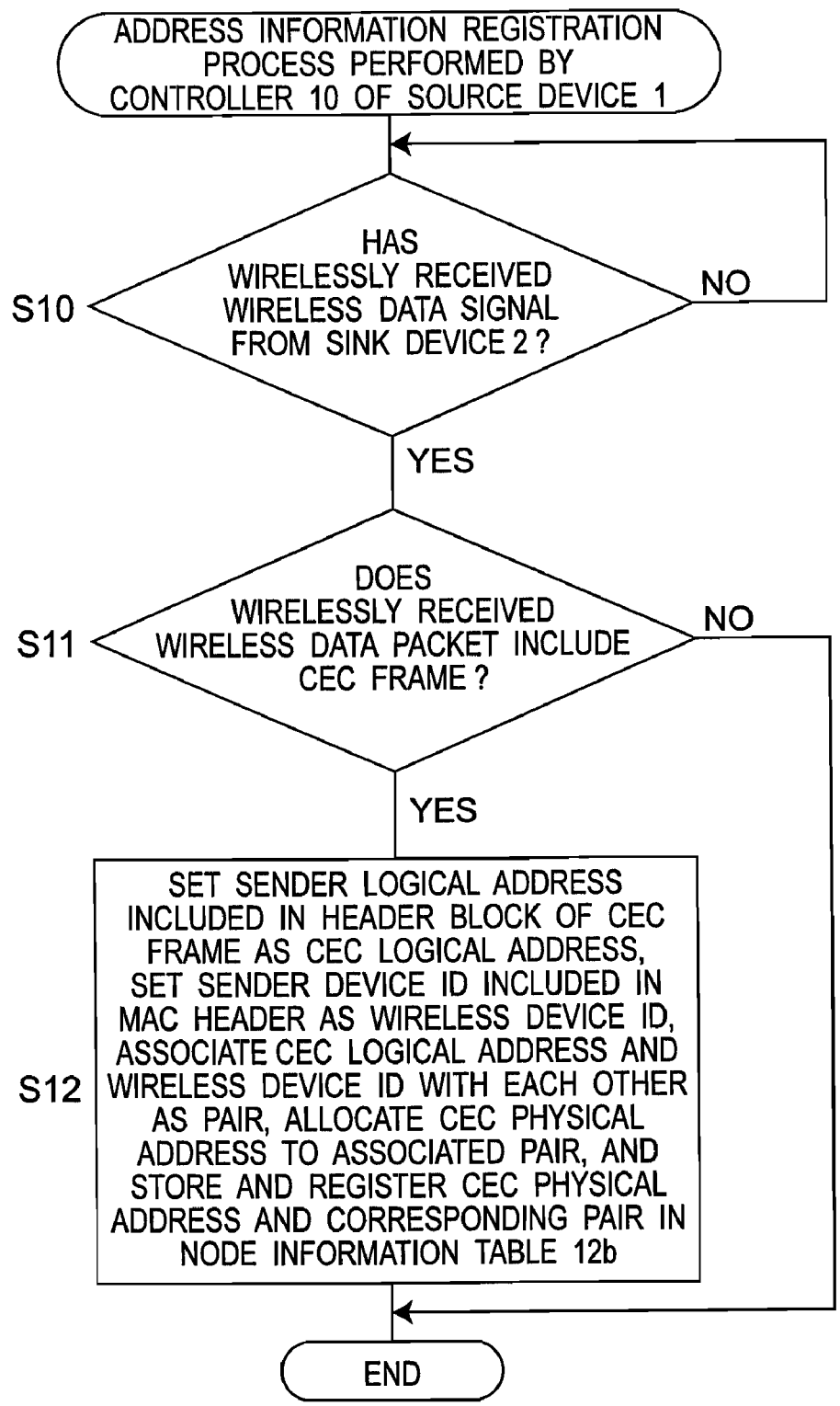
FIG. 7 is a flowchart showing an address information registration process performed by a controller 10 of a source device 1 of FIG. 1.

FIG. 7 is a flowchart showing an address information registration process performed by the controller 10 of the source device 1 of FIG. 1. At step S10 of FIG. 7, the controller 10 determines whether or not the controller 10 has wirelessly received a wireless data signal for address registration, for example, broadcasted by, for example, the sink device 2 via the antenna 16. If YES at step S10, the control flow goes to step S11. On the other hand, if NO at step S10, the control flow returns to step S10, and the process of step 10 is repeated. At step S11, the controller 10 determines whether or not a wireless data packet obtained by performing a received packet process on the wirelessly-received wireless data signal includes a CEC frame. If YES at step S11, the control flow goes to step S12. On the other hand, if NO at step S11, the process is completed. At step S12, the controller 10 sets the sender logical address included in the header block of the CEC frame as a CEC logical address, sets the sender device ID included in the MAC header of the wireless data packet as a wireless device ID, associates the CEC logical address and the wireless device ID with each other as a pair, allocates a CEC physical address to the associated pair, stores and registers the CEC logical address and the corresponding pair in the node information table 12b, and thereafter completes the process.

Figure 8:
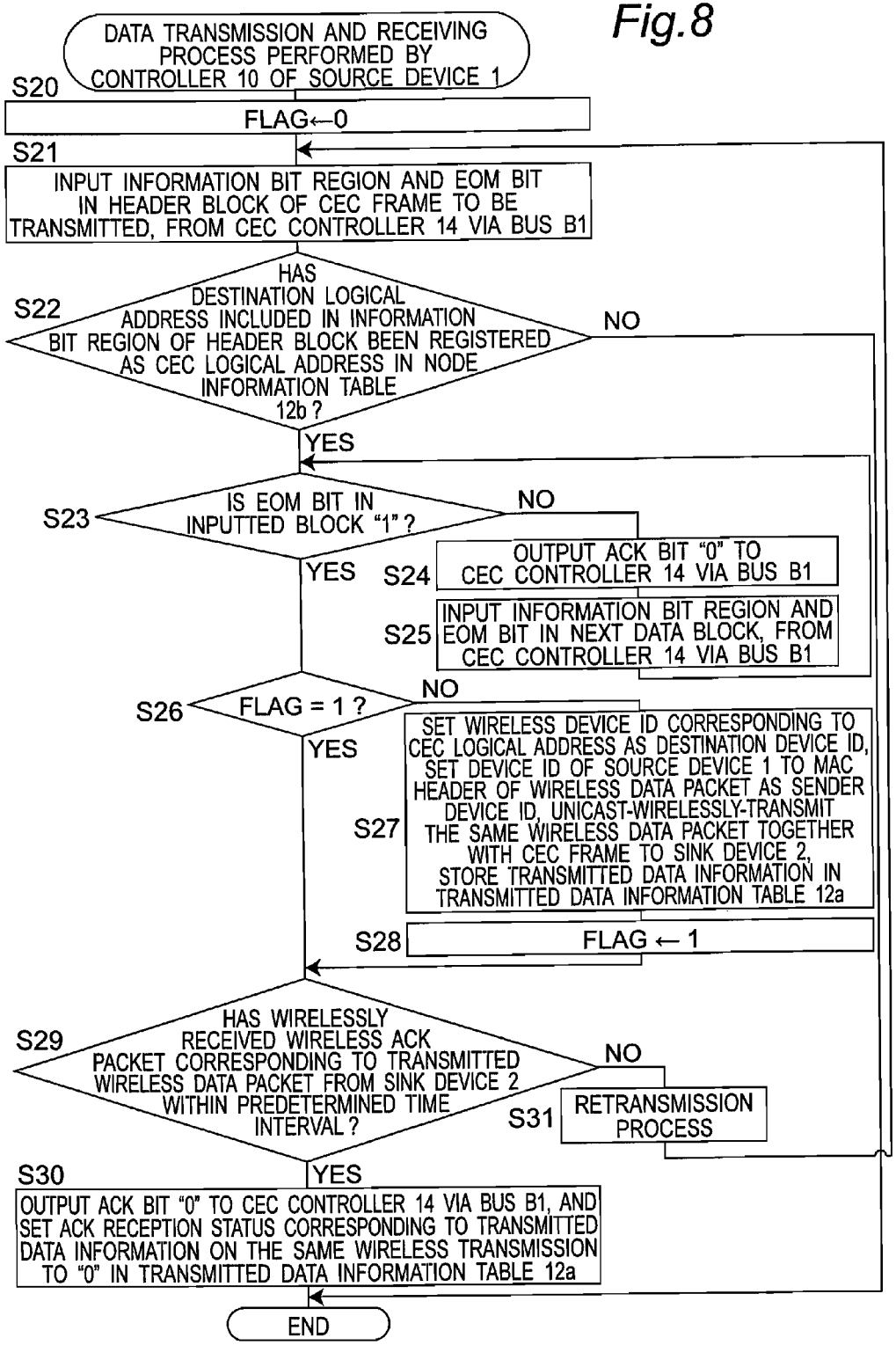
FIG. 8 is a flowchart showing a data transmission and receiving process performed by the controller 10 of the source device 1 of FIG. 1.

FIG. 8 is a flowchart showing a data transmission and receiving process performed by the controller 10 of the source device 1 of FIG. 1. At step S20 of FIG. 8, first of all, the controller 10 sets a flag FLAG to 0. Next, at step S21, the controller 10 inputs the information bit region and the EOM bit in the header block of a CEC frame to be transmitted, from the CEC controller 14 via the bus B1. Next, at step S22, the controller 10 determines whether or not the destination logical address included in the information bit region of the header block has been registered as the CEC logical address in the node information table 12b. If YES at step S22, the control flow goes to step S23. On the other hand, if NO at step S22, the controller 10 ignores the signal inputted from the CEC controller 14 via the bus B1, and completes the process. Next, at step S23, the controller 10 determines whether or not the EOM bit in the inputted block is "1". If YES at step S23, the control flow goes to step S26. On the other hand, if NO at step S23, the control flow goes to step S24. At step S24, the controller 10 outputs the ACK bit "0" to the CEC controller 14 via the bus B1, and thereafter, at step S25, the controller 10 inputs an information bit region and an EOM bit in a next data block, from the CEC controller 14 via the bus B1. Thereafter, the control flow returns to step S23, and the process of step S23 is repeated.

At step S26, the controller 10 determines whether or not the flag FLAG is 1. If YES at step S26, the control flow goes to step S29. On the other hand, if NO at step S26, the control flow goes to step S27. At step S27, the controller 10 sets the wireless device ID corresponding to the CEC logical address as the destination device ID, sets the device ID of the source device 1 to the MAC header of the wireless data packet as the sender device ID, unicast-wirelessly-transmits the same wireless data packet together with the CEC frame to the sink device 2, and thereafter stores transmitted data information in the transmitted data information table 12a. At step S28, the controller 10 sets the flag FLAG to 1, and thereafter the control flow goes to step S29. It is to be noted that the controller 10 sets the ACK bit to "0" in the last data block in the transmitted CEC frame. At step S29, the controller 10 determines whether or not the controller 10 has wirelessly received a wireless ACK packet in response to the transmitted data packet from the sink device 2 within a predetermined time interval. If YES at step S29, the control flow goes to step S30.

On the other hand, if NO at step S29, the control flow goes to step S31. At step S30, the controller 10 outputs the ACK bit "0" to the CEC controller 14 via the bus B1, sets the ACK receiving status corresponding to the wirelessly-transmitted data information to "0" in the transmitted data information table 12a, and completes the process. At step S31, the controller 10 allows the CEC controller 14 to execute a CEC frame retransmission process, and thereafter, the control flow returns to step S21, and the process of step S21 is repeated.

Figure 9:
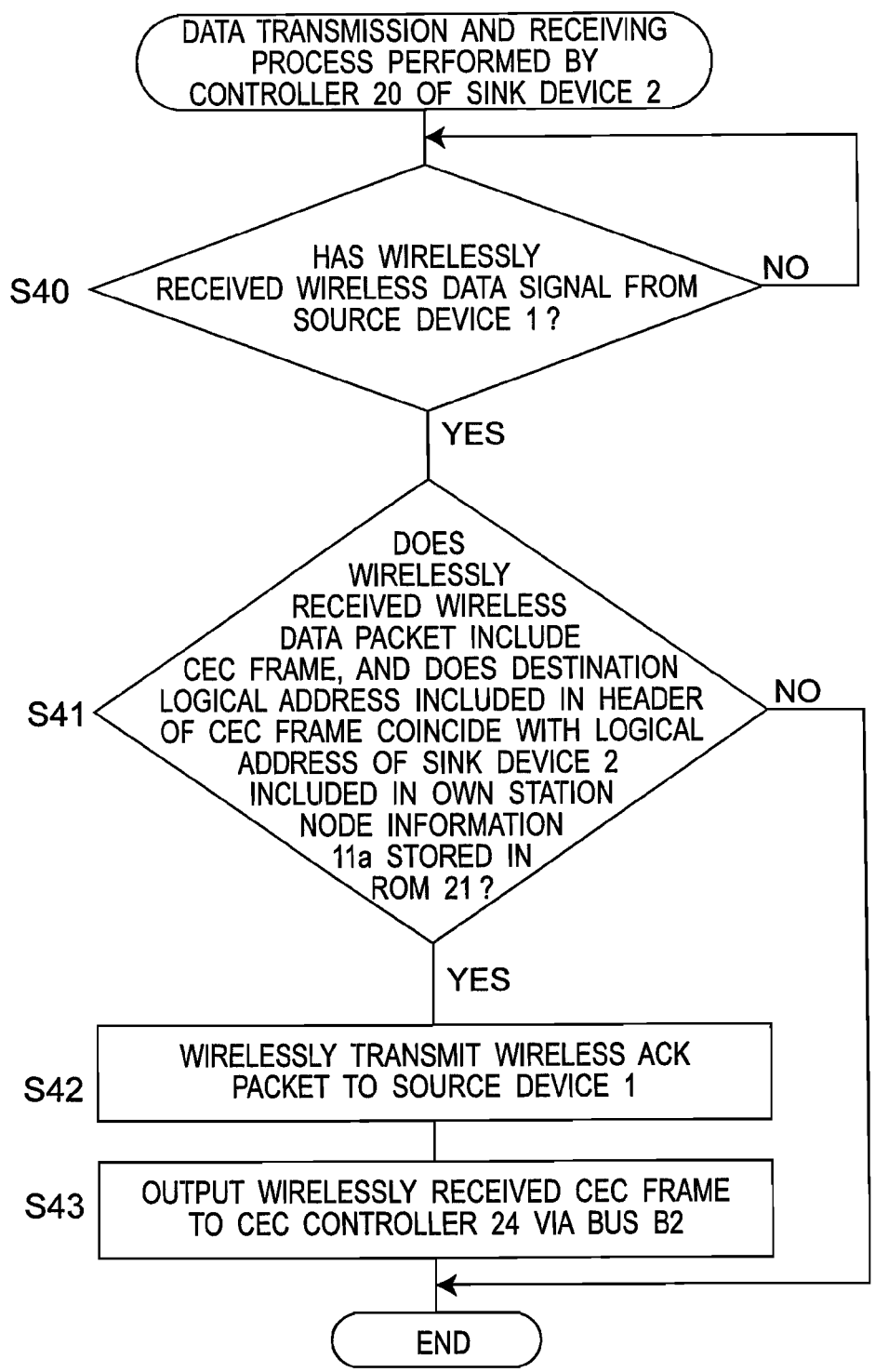
FIG. 9 is a flowchart showing a data transmission and receiving process performed by a controller 20 of a sink device 2 of FIG. 1.

FIG. 9 is a flowchart showing a data transmission and receiving process performed by the controller 20 of the sink device 20 of FIG. 1. At step S40 of FIG. 9, first of all, the controller 20 determines whether or not the controller 20 has wirelessly received the wireless data signal from the source device 1 via the antenna 26. If YES at step S40, the control flow goes to step S41. On the other hand, if NO at step S40, the control flow returns to step S40, and the process of step S40 is repeated. At step S41, the controller 20 determines whether or not the wireless data packet, which is obtained by performing the received packet process on the wirelessly-received wireless data signal, includes a CEC frame, and whether or not the destination logical address included in the header block of the CEC frame coincides with the own station logical address of the sink device 2 included in the own station node information 11a stored in the ROM 21. If YES at step S41, the control flow goes to step S42. On the other hand if NO at step S41, the process is completed. At step S42, the controller 20 wirelessly transmits a wireless ACK packet in response to the wirelessly-received wireless data packet, to the source device 1. At step S43, the controller 20 outputs the wirelessly-received CEC frame to the CEC controller 24 via the bus B2, and thereafter completes the process.

Figure 10:
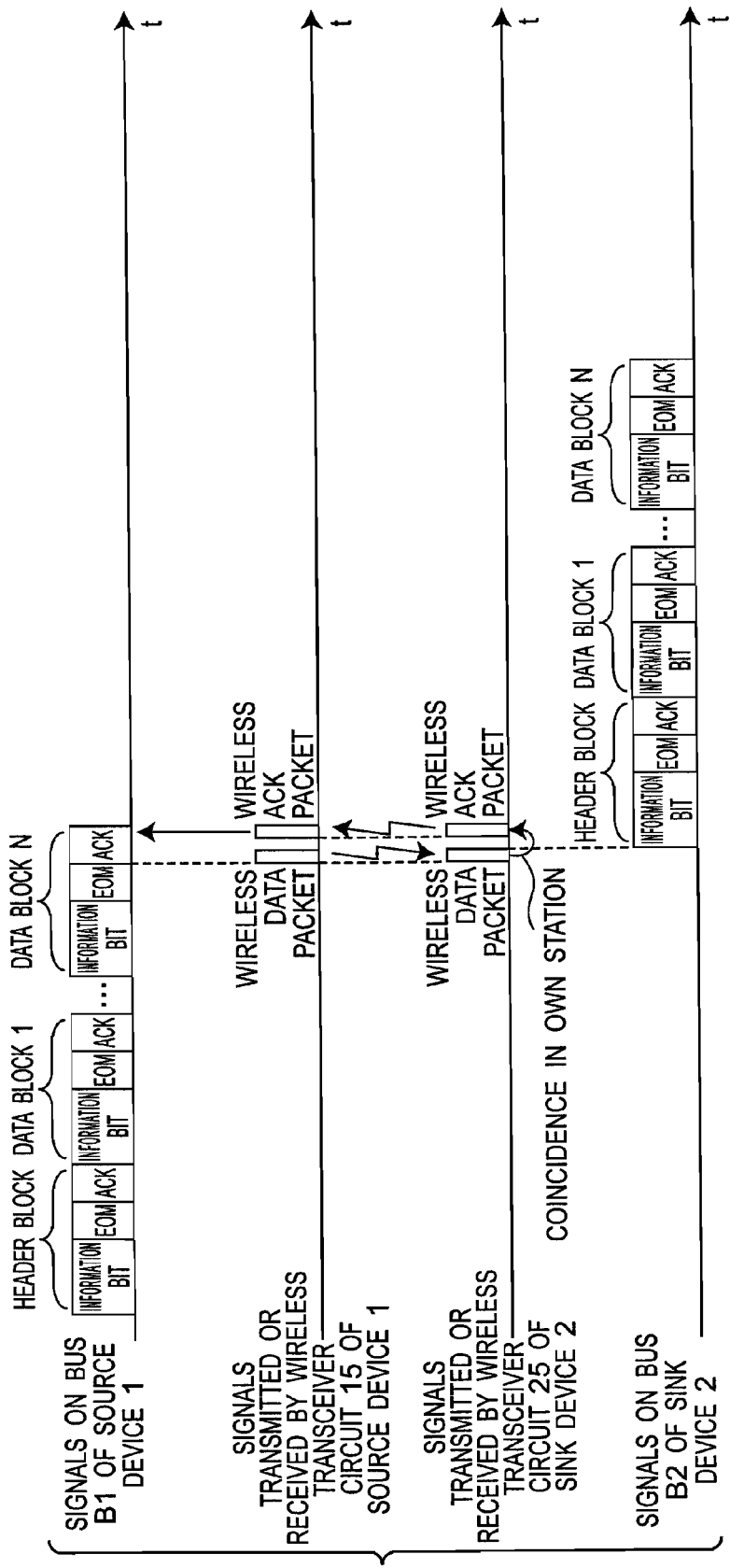
FIG. 10 is a sequence diagram showing signals of respective parts of the wireless communication system of FIG. 1, when a CEC message retransmission process is not performed.

FIG. 10 is a sequence diagram showing signals of the respective parts of the wireless communication system of FIG. 1. Referring to FIG. 10, such a case will be described by way of example that the source device 1 transmits a CEC frame including one header block and N data blocks to the sink device 2 will be described by way of example. It is assumed that address information on the sink device 2 has already been registered in the node information table 12b of the source device 1.

In the source device 1, the CEC controller 14 outputs a start bit (not shown) to the controller 10 via the bus B1, and thereafter outputs an information bit region and an EOM bit of the header block to the controller 10. In this case, the EOM bit of the header block is "0", since the header block is not the last block. The ACK bit is set to "1" in the transmission buffer of the bus interface of the CEC controller 14 previously. However, when the controller 10 has inputted the information bit region and the EOM bit of the header block normally, from the CEC controller 14 via the bus B1, the controller 10 outputs the ACK bit "0" and sets the ACK bit to "0" in the transmission buffer therein. This leads to that the CEC controller 14 recognizes that the information bit region and the EOM bit of the header block has been inputted to the controller 10 normally. Next, the CEC controller 14 outputs an information bit region and an EOM bit of a data block 1 to the controller 10 via the bus B1. Since this data block 1 is not the last block, the EOM bit is "0", and the controller 10 outputs the ACK bit "0". Subsequently, the operation similar to that for the data block 1 is performed up to a data block (N−1). Next, the CEC controller 14 outputs an information bit region and an EOM bit of a data block N to the controller 10 via the bus B1. Since this data block is the last data block, the EOM bit is "1". Upon detecting the EOM bit "1", the controller 10 allows the wireless transceiver circuit 15 to wirelessly transmit the wireless data packet including the CEC frame that includes the header block and the data blocks 1 to N to the sink device 2, and stores the transmitted data information on the CEC frame in the transmitted data information table 12a.

The controller 20 of the sink device 2 receive the wireless data packet transmitted from the source device 1 via the wireless transceiver circuit 25. When the destination logical address included in the received wireless data packet coincides with the own station logical address (that is, the destination of the wireless data packet is the own station), the controller 20 wirelessly transmits the wireless ACK packet to the source device 1, and outputs the header block and the data blocks 1 to N to the CEC controller 24 via the bus B2. In this case, the controller 20 may output the start bit, before outputting the header block and the data blocks 1 to N.

Upon receiving the wireless ACK packet from the sink device 2 via the wireless transceiver circuit 15, the controller 10 of the source device 1 outputs the ACK bit "0" to the CEC controller 14 via the bus B1, and stores "0" in the ACK receiving status corresponding to the same wireless transmission in the transmitted data information table 12a. In this case, after the CEC controller 14 outputs the EOM bit of the data block N, the controller 10 outputs the ACK bit "0" to the CEC controller 14 via the bus B1 before the CEC controller 14 samples the ACK bit of the data block N. Accordingly, the CEC controller 14 detects the ACK bit "0" of the data block N and recognizes that the sink device 2 has received the CEC frame normally. When the controller 10 does not outputs the ACK bit "0" to the CEC controller 14 via the bus B1 before the CEC controller 14 samples the ACK bit of the data block N in the transmission buffer, the ACK bit of the data block N remains the initial value of "1", and the CEC controller 14 recognizes that the transmission of the CEC frame to the sink device 2 has been failed. In this case, the controller 14 performs a retransmission process to generate the same header block and the same data blocks and re-output the generated header block and same data blocks to the controller 10 via the bus B1 after a lapse of predetermined time interval.

Figure 11:
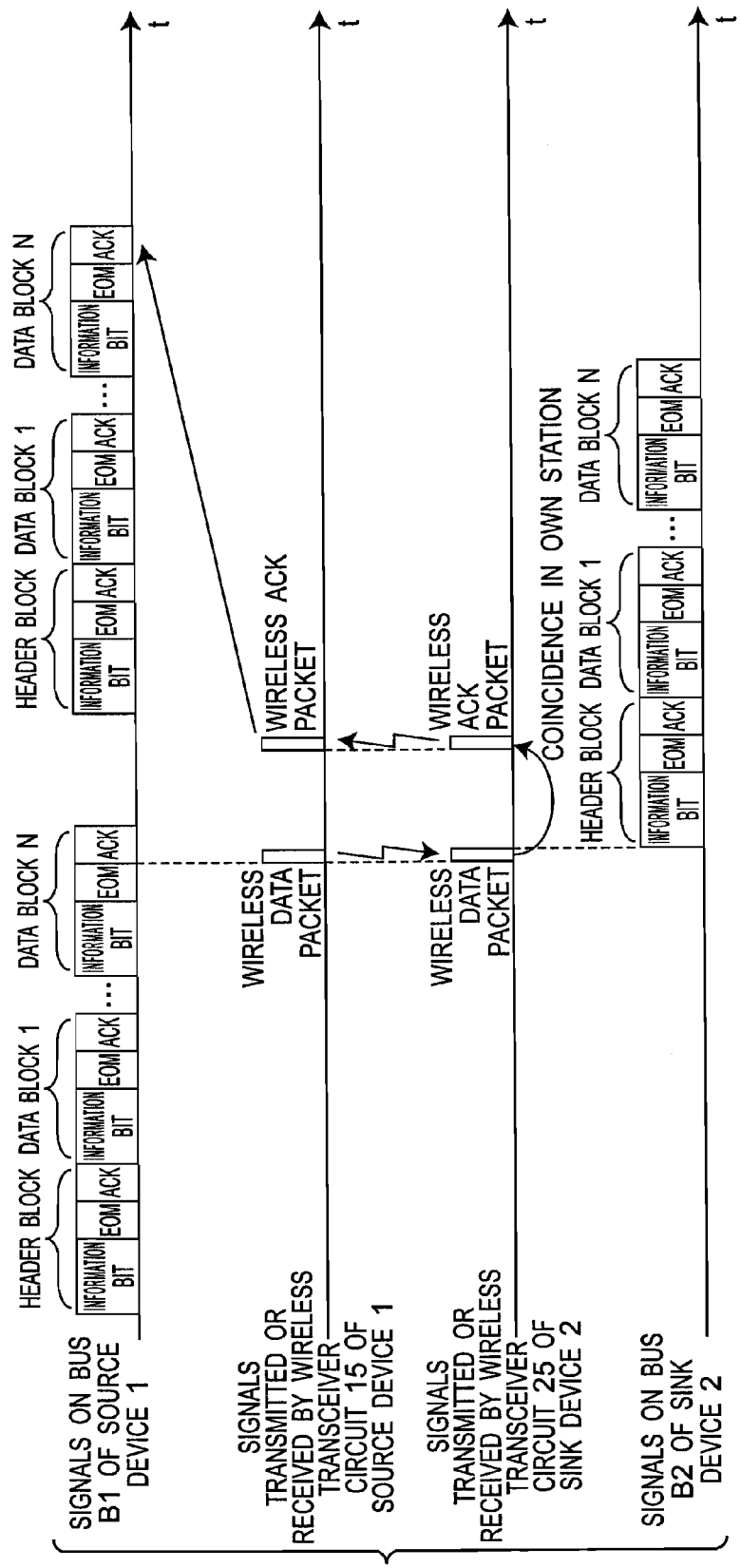
FIG. 11 is a sequence diagram showing signals of the respective parts of the wireless communication system of FIG. 1, when the CEC message retransmission process is performed.

FIG. 11 is a sequence diagram showing signals of the respective parts of the wireless communication system of FIG. 1, when the CEC frame retransmission process is performed. Referring to FIG. 11, when an EOM bit of the retransmitted data block N is inputted to the controller 10, the controller 10 outputs the ACK bit "0" to the CEC controller 14 via the bus B1 without wirelessly retransmitting the wireless data packet to the sink device 2, since the source device 1 has already received the wireless ACK packet from the sink device 2. It is determined whether or not the source device 1 has received the wireless ACK packet from the sink device 2 by referring to, for example, the ACK receiving status in the transmitted data table 18. When the source device 1 has not received the wireless ACK packet from the sink device 2, at the timing when the EOM bit of the retransmitted data block N is inputted to the controller 10, the ACK bit of the data block N remains "1". Accordingly, the CEC controller 14 re-executes the CEC frame retransmission process.

As described above, the wireless communication system according to the first embodiment can make the simple appearance by eliminating the wirings for transmitting and receiving the CEC message, and easily transmit the CEC message from one wireless communication device to a plurality of wireless communication devices without any changes in the cable connections, by wirelessly communicating the CEC message.

In addition, the controller 10 includes the transmitted data information table 12a for storing whether or not the wireless ACK packet in response to the transmitted wireless data packet has been received. Accordingly, when the source device 1 does not receive the wireless ACK packet, the CEC controller 14 can perform the retransmission process.

In the present embodiment, the ACK bit of each of the header block and the data blocks 1 to (N−1) is set to "0" when the ACK has been inputted to the controller 10 normally. However, the present invention is not limited to this. Alternatively, a wireless data packet may be generated and transmitted for every block, and the ACK bit of each block may be set to "0" when a wireless ACK packet in response to the wireless data packet has been received.

Figure 12:
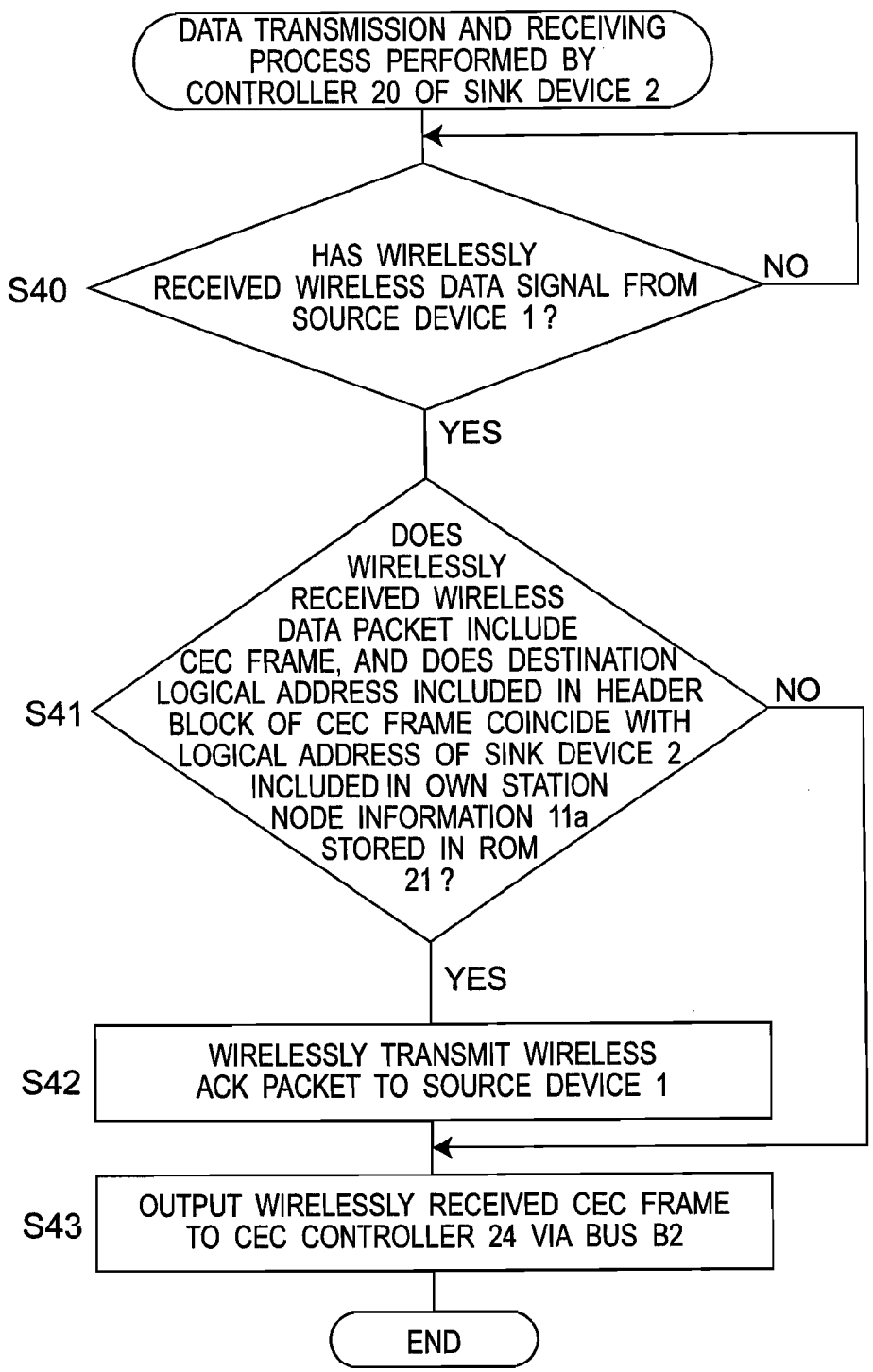
FIG. 12 is a flowchart showing another data transmission and receiving process performed by the controller 20 of the sink device 2 of FIG. 1.

In addition, at step S27 of FIG. 8, the wireless data packet is unicast-wirelessly-transmitted. However, the present invention is not limited to this. Alternatively, the wireless data packet may be broadcast-wirelessly transmitted. In this case, at step S27 of FIG. 8, a predetermined value indicating that the wireless data packet is broadcast-wirelessly-transmitted is set to the destination device ID for the wireless data packet. In addition, in this case, it is unnecessary for the source device 1 to perform the address registration process of FIG. 7. As shown in FIG. 12, in the data transmission and receiving process performed by the sink device 2, when it is determined NO at step S41, step S43 may be executed.

Still further, the formats showing the wireless data packet, the CEC frame, the header block or each of the data blocks described in detail with reference to FIGS. 4, 5, and 6, respectively, are given only by way of example and may be configured differently. For example, the CEC frame region 700 included in the wireless data packet 1000 transmitted or received between the source device 1, and the sink device 2 does not necessarily include the start bit, the EOM bit, and the ACK bit.

Figure 13:
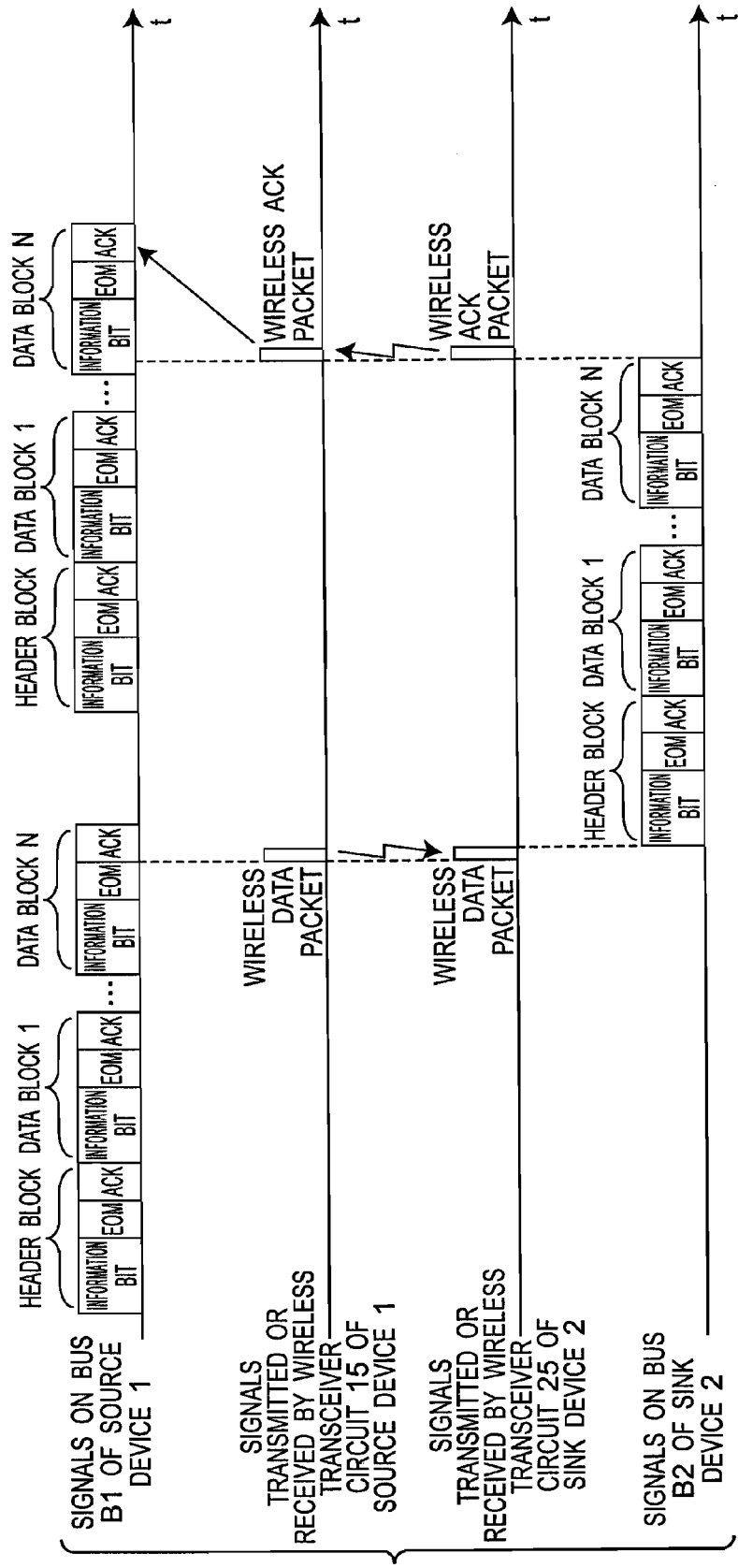
FIG. 13 is another sequence diagram showing signals of the respective parts of the wireless communication system of FIG. 1.

In addition, in FIGS. 10 and 11, after receiving the wireless data packet from the source device 1, when the destination logical address included in the received CEC frame coincides with the own station logical address of the sink device 2, the sink device 2 wirelessly transmits the wireless ACK packet to the source device 1. However, the present invention is not limited to this configuration. As shown in FIG. 13, for example, the controller 20 of the sink device 2 may wirelessly transmit the wireless ACK packet to the source device 1, after outputting all of the CEC frames included in the received wireless data packet to the CEC controller 24 via the bus B2.

Still further, in the source device 1, the controller 10 and the CEC controller 14 include the bus interfaces, respectively, and are connected to each other by the bus B1. However, the present invention is not limited to this configuration. Alternatively, the controller 10 and the CEC controller 14 may include interfaces other than the bus interfaces, respectively. In this case, the controller 10 may input a wireless data packet including a CEC frame conforming to a format of the other interface. In addition, the controller 10 may perform a receiving acknowledgement to the other interface instead of outputting the ACK bit "0" to the CEC controller 14 via the bus B1. In a manner similar to this, in the sink device 2, the controller 20 and the CEC controller 24 include the bus interfaces, respectively, and are connected to each other by the bus B2. However, the present invention is not limited to this configuration. Alternatively, the controller 20 and the CEC controller 24 may include interfaces other than the bus interfaces, respectively.

Figure 14:
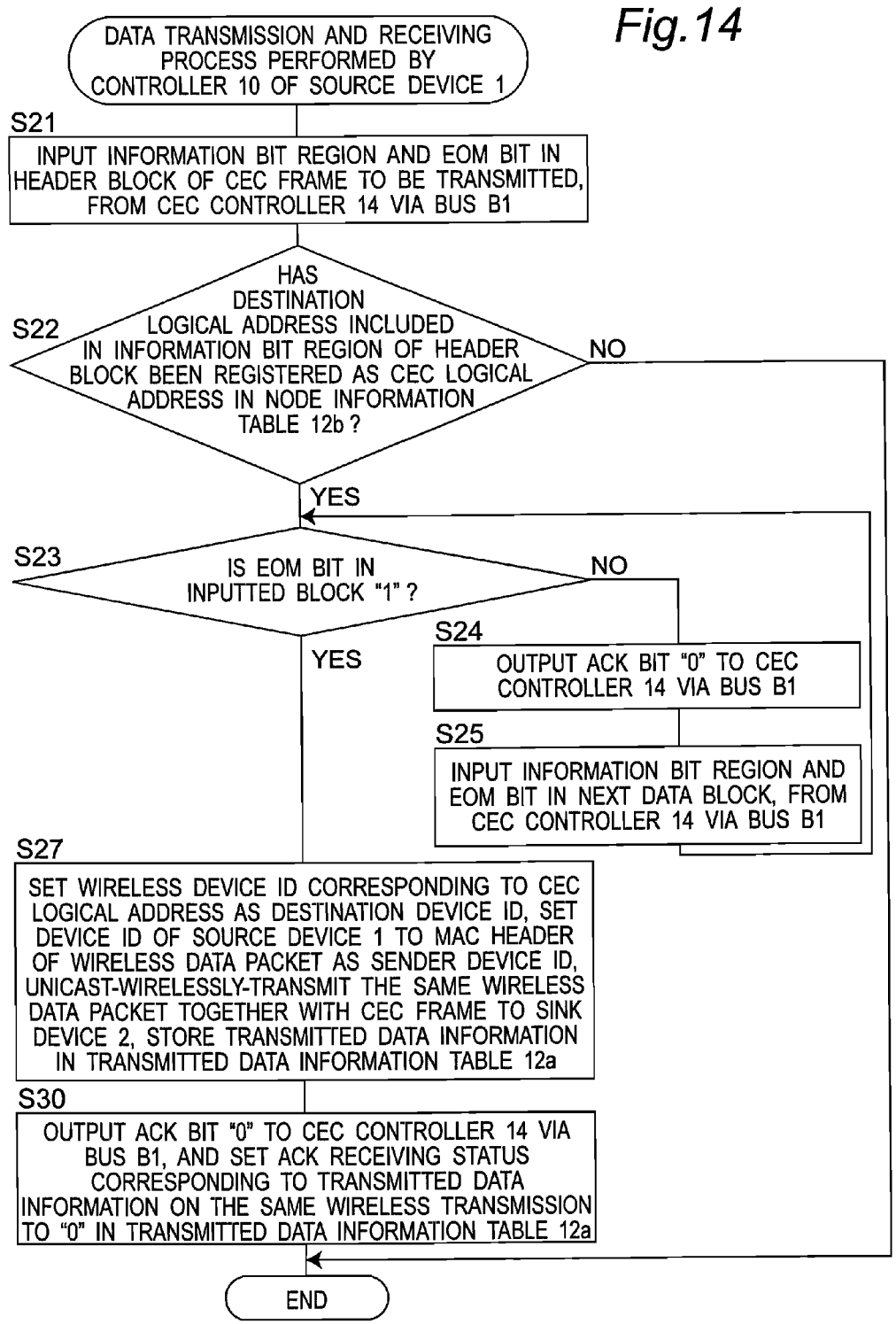
FIG. 14 is a flowchart showing another data transmission and receiving process performed by the controller 10 of the source device 1 of FIG. 1.

In addition, in the source device 1, the controller 10 outputs the ACK bit "0" to the CEC controller 14 via the bus B1, after receiving the wireless ACK packet in response to the wirelessly-transmitted wireless data packet, from the sink device 2. However, the present invention is not limited to this configuration. For example, as shown in FIG. 14, after transmitting the wireless data packet, the controller 10 may output the ACK bit "0" to the CEC controller 14 via the bus B1 without waiting for the wireless ACK packet from the sink device 2. The flowchart of FIG. 14 is different from that of FIG. 8 in that steps S20, 26, 28, 29, and 31 are eliminated from the flowchart of FIG. 8.

Second Embodiment

Figure 15:
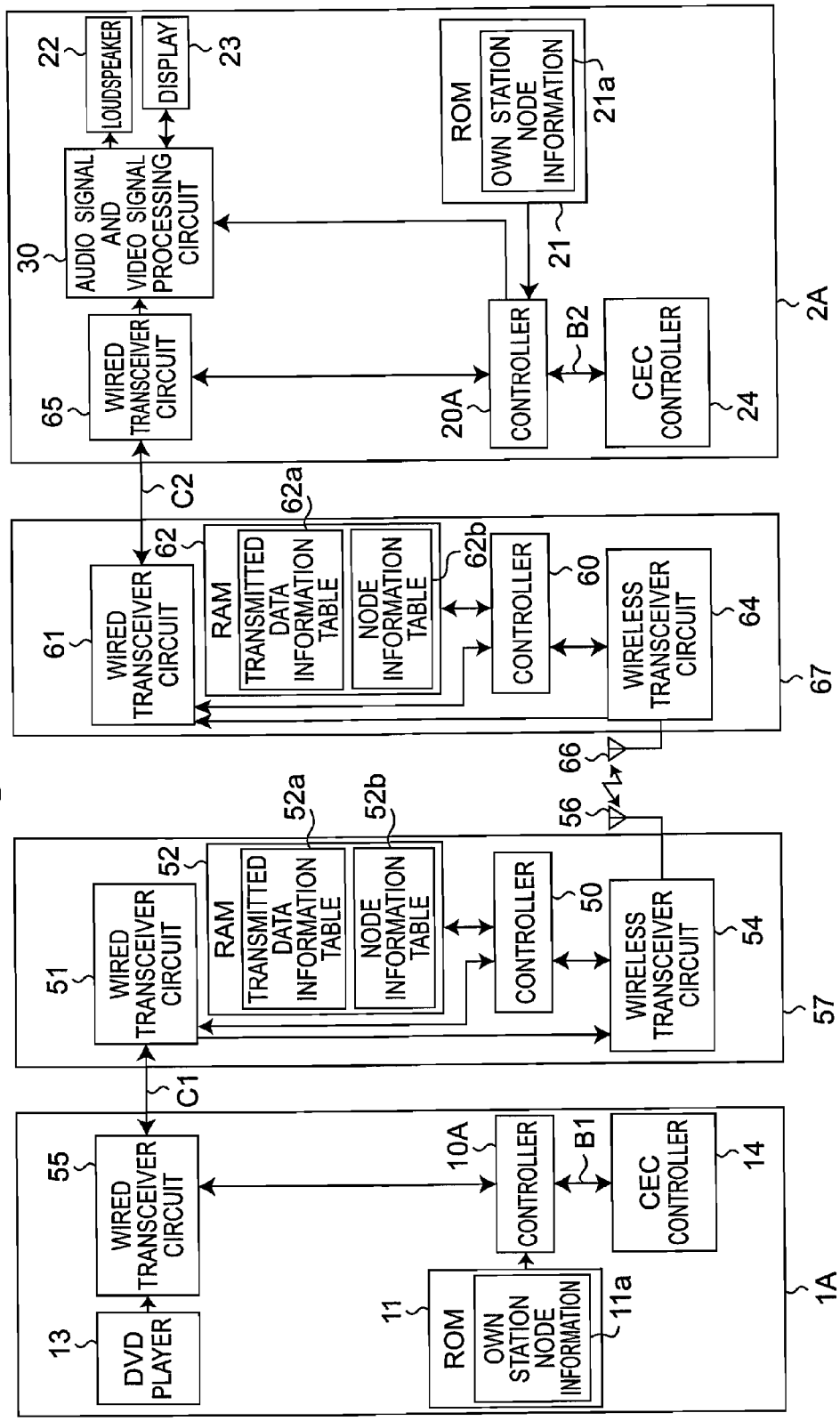
FIG. 15 is a block diagram showing a configuration of a wireless communication system according to a second embodiment of the present invention.

FIG. 15 is a block diagram showing a wireless communication system according to a second embodiment of the present invention. Referring to FIG. 15, the wireless communication system according to the present embodiment is configured to include a source device 1A, a sink device 2A, and adapter devices 57 and 67. The source device 1A is different from the source device 1 according to the first embodiment of FIG. 1 in that the source device 1A includes a wired transceiver circuit 55 and a controller 10A instead of the antenna 16, the wireless transceiver circuit 15, the RAM 12, and the controller 10 according to the first embodiment of FIG. 1. The sink device 2A is different from the sink device 2 according to the first embodiment of FIG. 1 in that the sink device 2A includes a wired transceiver circuit 65 and a controller 20A instead of the antenna 26, the wireless transceiver circuit 25, the RAM 27, and the controller 20 according to the first embodiment of FIG. 1. The wireless communication system according to the present embodiment is similar to that according to the first embodiment in the other respects, and components denoted by the same reference symbols will not be described in detail.

Referring to FIG. 15, the adapter device 57 is configured to include a controller 50, a wired transceiver circuit 51, a RAM 52, a wireless transceiver circuit 54, and an antenna 56. The adapter device 67 is configured to include a controller 60, a wired transceiver circuit 61, a RAM 62, a wireless transceiver circuit 64, and an antenna 66. The source device 1A and the adapter device 57 are connected to each other via a cable C1. The sink device 2A and the adapter device 67 are connected to each other via a cable C2.

In the source device 1A, the controller 10A outputs a CEC frame inputted from a CEC controller 14 to the wired transceiver circuit 55, and outputs a CEC frame received from the sink device 2a via the wired transceiver circuit 55 and the adapter device 57 to the CEC controller 14. The wired transceiver circuit 55 transmits the video signal and the audio signal read out from the DVD player 13 or the CEC frame inputted from the controller 10A to the adapter device 57 via the cable C1. Further, the wired transceiver circuit 55 receives the CEC frame transmitted by the sink device 2, from the adapter device 57 via the cable C1.

In the adapter device 57, the wired transceiver circuit 51 outputs the video signal and the audio signal received from the source device 1A via the cable C1, to the wireless transceiver circuit 54. In addition, the wired transceiver circuit 51 transmits the CEC frame received from the source device 1A via the cable C1 to the controller 50, or transmits the CEC frame transmitted from the sink device 2A to the source device 1A via the cable C1. The controller 50 generates a wireless data packet including the CEC frame outputted from the wired transceiver circuit 51, and outputs the wireless data packet to the wireless transceiver circuit 54. Further, the controller 50 stores transmitted data information on the output CEC frame in a transmitted data information table 52a in the RAM 52. Further, the controller 50 executes an address information registration process and a data transmission and receiving process based on the CEC frame included in the wireless data packet received from the sink device 2A via the wireless transceiver circuit 54 and the antenna 56. The RAM 52 stores the transmitted data information table 52a having a configuration similar to that of the transmitted data information table 12a of FIG. 3, and a node information table 52b having a configuration similar to that of the node information table 12b of FIG. 2. It is to be noted that a CEC logical address and a wireless device ID of the source device 1A itself may be generated, based on the own station node information 11a read out from the ROM 11 of the source device 1A via the wired transceiver circuits 51 and 55 and the controller 10A, at a timing, for example, when the adapter device 57 is connected to the source device 1A. Since the wireless transceiver circuit 54 and the antenna 56 are configured in manners similar to those of the wireless transceiver circuit 15 and the antenna 16 of FIG. 1, respectively, the wireless transceiver circuit 54 and the antenna 56 will not be described in detail.

In the sink device 2A, the controller 20A is configured in a manner similar to that of the controller 10A of the source device 1A, and the wired transceiver circuit 65 is configured in a manner similar to that of the wired transceiver circuit 55 of the source device 1A. However, the wired transceiver circuit 65 outputs an AV signal received via the cable C2 to the audio and video signal processing circuit 30. In addition, the controller 20A controls the audio signal and video signal processing circuit 30 instead of the DVD player 13. In addition, each of the controller 60, the wired transceiver circuit 61, the RAM 62, and the wireless transceiver circuit 64 of the adapter device 67 is configured in a manner similar to that of each of the controller 50, the wired transceiver circuit 51, the RAM 52, and the wireless transceiver circuit 54 of the adapter device 57, respectively. However, the RAM 62 stores a transmitted data information table 62a has a configuration similar to that of the transmitted data information table 12a of FIG. 3, and a node information table 62b has a configuration similar to that of the node information table 12b of FIG. 2. Further, the wireless transceiver circuit 64 outputs an AV signal to the wired transceiver circuit 61.

The operation performed by the wireless communication system configured as stated above will be described with reference to FIG. 16. FIG. 16 is a sequence diagram showing signals of respective parts of the wireless communication system of FIG. 15. Referring to FIG. 16, such a case will be described by way of example that the source device 1A and the adapter device 57 transmit a CEC frame to the sink device 2A and the adapter device 67, and the sink device 2A and the adapter device 67 receive the CEC frame from the source device 1A and the adapter device 57. However, the present invention is not limited to this operation. Alternatively, an inverse operation may be performed. Namely, the sink device 2A and the adapter device 67 may transmit the CEC frame to the source device 1A and the adapter device 57, and the source device 1A and the adapter device 57 may receive the CEC frame from the sink device 2A and the adapter device 67. It is assumed that address information on the sink device 2A has already been registered in the node information table 52b of the adapter device 57.

Referring to FIG. 16, the CEC frame generated by the CEC controller 14 of the source device 1A is outputted to the controller 10A via the bus B1, and thereafter, transmitted to the adapter device 57 via the controller 10A, the wired transceiver circuit 55, and the cable C1. The controller 50 of the adapter device 57 processes the CEC frame received from the source device 1A via the wired transceiver circuit 51 in a manner similar to that of the wireless communication system according to the first embodiment, generates a wireless data packet, and allows the wireless transceiver circuit 54 to wirelessly transmit the generated wireless data packet to the adapter device 67 via the antenna 56 as a wireless data signal.

The wireless data signal wirelessly transmitted from the adapter device 57 via the antenna 56 is wirelessly received by the wireless transceiver circuit 64 of the adapter device 67 via the antenna 66. When the wirelessly-received wireless data packet includes the CEC frame and the destination logical address for the wireless data packet coincides with an own station logical address of the sink device 2A, the controller 60 of the adapter device 67 transmits all of the CEC frames to the sink device 2A via the wired transceiver circuit 61 and the cable C2, and thereafter, transmits a wireless ACK packet to the adapter device 57 via the wireless transceiver circuit 64 and the antenna 66. Since the adapter device 57 does not receive the wireless ACK packet within a predetermined time interval, the CEC controller 14 performs the CEC frame retransmission process. However, since the controller 50 has already received the wireless ACK packet from the adapter device 67 at the timing when the controller 50 received an EOM bit of a data block N in the retransmitted CEC frame, the controller 50 transmits an ACK bit "0" in response to the data block N to the CEC controller 14 without wirelessly retransmitting the wireless data packet. Accordingly, the CEC controller 14 can recognize that the CEC frame has been received by the adapter device 67 normally.

As described above, in the wireless communication system according to the second embodiment, the CEC controller 14 generating the CEC frame and the controller 50 are connected to each other via the bus B1 and the cable C1, and the CEC controller 24 and the controller 60 are connected to each other via the bus B2 and the cable C2. Accordingly, even the source device 1A or the sink device 2A that does includes only a wired interface for transmitting and receiving the CEC message can wirelessly transmit or receive the CEC frame by attaching the adapter device 57 or 67 to the source device 1A or the sink device 2A, respectively.

INDUSTRIAL APPLICABILITY

Accordingly, the wireless communication device, the wireless communication system, and the method of controlling a wireless communication device according to the present invention can make the simple appearance by eliminating wirings for transmitting and receiving the CEC message, and make it possible to easily transmit the CEC message from one wireless communication device to a plurality of wireless communication devices without any changes in the cable connections, by wirelessly communicating the CEC message.

The wireless communication device, the wireless communication system, and the method of controlling a wireless communication device according to the present invention can be used for wirelessly communicating the CEC message specified in the HDMI standard in an AV system such as a DVD player or a television receiver.

The invention claimed is:

1. A wireless communication device of a first wireless communication device for use in a wireless communication system, said wireless communication system including a plurality of wireless communication devices for transmitting and receiving a CEC (Consumer Electronics Control) message specified in an HDMI (High-Definition Multimedia Interface) standard, said plurality of wireless communication devices including said first wireless communication device and a second wireless communication device, said first wireless communication device comprising:

a CEC controller for generating and outputting a CEC frame including a CEC message;

a packet controller for generating a wireless data packet including the CEC message in the generated CEC frame; and a wireless transceiver for wirelessly transmitting a wireless signal including the generated wireless data packet to said second wireless communication device, and for receiving a wireless signal including a wireless receiving response packet and wirelessly transmitted from said second wireless communication device in response to the wireless data packet in the wirelessly-transmitted wireless signal; and a table including CEC logical addresses of respective devices constituting the wireless communication system;

wherein a header block of the CEC frame from the CEC controller is inputted to the packet controller, and the packet controller determines whether or not a destination logical address included in the header block is registered in the table, and wherein, when the destination logical address is not registered in the table, the packet controller completes a process without outputting a predetermined acknowledge signal to the CEC controller.

2. The wireless communication device as claimed in claim 1, wherein said CEC controller and said packet controller are connected to each other via an internal bus.

3. The wireless communication device as claimed in claim 1, wherein said CEC controller and said packet controller are connected to each other via an internal bus and a wired connection.

4. The wireless communication device as claimed claim 1, wherein, upon receiving the wireless receiving response packet from said second wireless communication device within a predetermined time interval, said packet controller outputs a predetermined acknowledge signal to said CEC controller, and wherein, upon not receiving the wireless receiving response packet in response to the wireless data packet from said second wireless communication device within a predetermined time interval, said packet controller stops outputting the acknowledge signal to said CEC controller.

5. The wireless communication device as claimed in claim 4, wherein, upon not detecting the acknowledge signal from said packet controller within a predetermined time interval after outputting the CEC frame, said CEC controller re-outputs the CEC frame, and wherein, upon inputting the re-outputted CEC frame from said CEC controller, when the wireless receiving response packet in response to the wireless data packet has already been received, said packet controller stops wirelessly transmitting the wireless data packet and outputs the acknowledge signal to said CEC controller.

6. The wireless communication device as claimed in claim 5, further comprising:

a storage unit for associating (a) at least a part of the CEC frame in the wireless data packet and (b) a receiving status indicating whether or not the wireless response receiving packet in response to the wireless data packet has been received, and for storing the part of the CEC frame in the wireless data packet and the receiving status in a transmitted data information table, wherein, when said packet controller wirelessly transmits the wireless signal including the wireless data packet, said packet controller stores at least the part of the CEC frame in the wireless data packet in the transmitted data information table, and wherein, upon wirelessly receiving the wireless response receiving packet, said packet controller stores the receiving status indicating that the wireless response receiving packet in response to the wireless data packet has been received.

7. The wireless communication device as claimed in claim 1, wherein, upon inputting the CEC frame generated by said CEC controller, said packet controller outputs a predetermined acknowledge signal to said CEC controller when a destination of the CEC frame is wirelessly connected to the first wireless communication device.

8. The wireless communication device as claimed in claim 1, wherein the CEC frame includes at least one block having a predetermined format, wherein said packet controller outputs the acknowledge signal to said CEC controller when the block is not a last block, and wherein said packet controller wirelessly transmits the wireless data packet when the block is the last block.

9. The wireless communication device as claimed in claim 1, wherein, upon receiving the wireless signal of the wireless data packet wirelessly transmitted from said second wireless communication device, said packet controller sets a sender logical address of said second wireless communication device included in a CEC frame in the wireless data packet as a CEC logical address, sets a sender device ID in the wireless data packet as a wireless device ID, associates the CEC logical address and the wireless device ID with each other as a pair, allocates a CEC physical address to the associated pair, and thereafter stores the CEC physical address and a corresponding pair in a storage unit as the table.

10. A wireless communication system including a plurality of wireless communication devices for transmitting and receiving a CEC (Consumer Electronics Control) message specified in an HDMI (High-Definition Multimedia Interface) standard, wherein said plurality of wireless communication devices includes a plurality of first wireless communication devices and a second wireless communication device, wherein each of said first wireless communication devices comprises:

a CEC controller for generating and outputting a CEC frame including a CEC message;

a packet controller for generating a wireless data packet including the CEC message in the generated CEC frame; and wireless transceiver for wirelessly transmitting a wireless signal including the generated wireless data packet to said second wireless communication device, and for receiving a wireless signal including a wireless receiving response packet and wirelessly transmitted from said second wireless communication device in response to the wireless data packet in the wirelessly-transmitted wireless signal; and a table including CEC logical addresses of respective devices constituting the wireless communication system;

wherein a header block of the CEC frame from the CEC controller is inputted to the packet controller, and the packet controller determines whether or not a destination logical address included in the header block is registered in the table, and wherein, when the destination logical address is not registered in the table, the packet controller completes a process without outputting a predetermined acknowledge signal to the CEC controller.

11. A method of controlling a wireless communication device of a first wireless communication device for a wireless communication system, said wireless communication system including a plurality of wireless communication devices for transmitting and receiving a CEC (Consumer Electronics Control) message specified in an HDMI (High-Definition Multimedia Interface) standard, said plurality of wireless communication devices including said first wireless communication device and a second wireless communication device, the method including the following steps of:

generating and outputting a CEC frame including a CEC message;

generating a wireless data packet including the CEC message in the generated CEC frame; and wirelessly transmitting a wireless signal including the generated wireless data packet to said second wireless communication device, and receiving a wireless signal including a wireless receiving response packet and wirelessly transmitted from said second wireless communication device in response to the wireless data packet in the wirelessly-transmitted wireless signal;

when a header block of the CEC flame from the CEC controller is inputted, determining whether or not a destination logical address included in the header block is registered in a table including CEC logical addresses of respective devices constituting the wireless communication system, and completing a process without outputting a predetermined acknowledge signal when the destination logical address is not registered in the table.

12. The method of controlling the wireless communication device as claimed in claim 11, further including the following steps of:

upon receiving the wireless receiving response packet from said second wireless communication device within a predetermined time interval, outputting a predetermined acknowledge signal, and upon not receiving the wireless receiving response packet in response to the wireless data packet from said second wireless communication device within a predetermined time interval, stopping outputting the acknowledge signal.

13. The method of controlling the wireless communication device as claimed in claim 12, further including the following steps of:

upon not detecting the acknowledge signal within a predetermined time interval after outputting the CEC frame, re-outputting the CEC frame, and upon inputting the re-outputted CEC frame, when the wireless receiving response packet in response to the wireless data packet has already been received, stopping wirelessly transmitting the wireless data packet and outputting the acknowledge signal.

14. An adapter wireless communication device of a first adapter wireless communication device for use in a wireless communication system, said wireless communication system including a plurality of adapter wireless communication devices for transmitting and receiving a CEC (Consumer Electronics Control) message specified in an HDMI (High-Definition Multimedia Interface) standard and included in a CEC frame generated by an AV device, said plurality of wireless communication devices including said first adapter wireless communication device and a second adapter wireless communication device, said first adapter wireless communication device comprising:

a controller for generating a wireless data packet including the CEC message in the generated CEC frame:

a wireless transceiver for wirelessly transmitting a wireless signal including the generated wireless data packet to said second adapter wireless communication device, and for receiving a wireless signal including a wireless receiving response packet and wirelessly transmitted from said second adapter wireless communication device in response to the wireless data packet in the wirelessly-transmitted wireless signal; and a table including CEC logical addresses of respective devices constituting the wireless communication system;

wherein a header block of the CEC frame from the AV device is inputted to the controller, and the controller determines whether or not a destination logical address included in the header block is registered in the table, and wherein, when the destination logical address is not registered in the table, the controller completes a process without outputting a predetermined acknowledge signal to the AV device.

15. The adapter wireless communication device as claimed in claim 14, wherein said AV device and said controller are connected to each other via a wired connection.

16. The adapter wireless communication device as claimed claim 14, wherein, upon receiving the wireless receiving response packet from said second adapter wireless communication device within a predetermined time interval, said controller outputs a predetermined acknowledge signal to said AV device, and wherein, upon not receiving the wireless receiving response packet in response to the wireless data packet from said second adapter wireless communication device within a predetermined time interval, said controller stops outputting the acknowledge signal to said AV device.

17. The adapter wireless communication device as claimed in claim 16, wherein, upon not detecting the acknowledge signal from said controller within a predetermined time interval after outputting the CEC frame, said AV device re-outputs the CEC frame, and wherein, upon inputting the re-outputted CEC frame from said AV device, when the wireless receiving response packet in response to the wireless data packet has already been received, said controller stops wirelessly transmitting the wireless data packet and outputs the acknowledge signal to said AV device.

18. The adapter wireless communication device as claimed in claim 17, further comprising:

a storage unit for associating (a) at least a part of the CEC frame in the wireless data packet and (b) a receiving status indicating whether or not the wireless response receiving packet in response to the wireless data packet has been received, and for storing the part of the CEC frame in the wireless data packet and the receiving status in a transmitted data information table, wherein, when said controller wirelessly transmits the wireless signal including the wireless data packet, said controller stores at least the part of the CEC frame in the wireless data packet in the transmitted data information table, and wherein, upon wirelessly receiving the wireless response receiving packet, said controller stores the receiving status indicating that the wireless response receiving packet in response to the wireless data packet has been received.

19. The adapter wireless communication device as claimed in claim 14, wherein, upon inputting the CEC frame generated by said AV device, said controller outputs a predetermined acknowledge signal to said AV device when a destination of the CEC frame is wirelessly connected to the first adapter wireless communication device.

20. The adapter wireless communication device as claimed in claim 14, wherein the CEC frame includes at least one block having a predetermined format, wherein said controller outputs the acknowledge signal to said AV device when the block is not a last block, and wherein said controller wirelessly transmits the wireless data packet when the block is the last block.

21. The adapter wireless communication device as claimed in claim 14, wherein, upon receiving the wireless signal of the wireless data packet wirelessly transmitted from said second adapter wireless communication device, said controller sets a sender logical address of said second adapter wireless communication device included in a CEC frame in the wireless data packet as a CEC logical address, sets a sender device ID in the wireless data packet as a wireless device ID, associates the CEC logical address and the wireless device ID with each other as a pair, allocates a CEC physical address to the associated pair, and thereafter stores the CEC physical address and a corresponding pair in a storage unit as the table.

22. A wireless communication system including a plurality of adapter wireless communication devices for transmitting and receiving a CEC (Consumer Electronics Control) message specified in an HDMI (High-Definition Multimedia Interface) standard and included in a CEC frame generated by an AV device, wherein said plurality of wireless communication devices includes a plurality of first adapter wireless communication devices and a second adapter wireless communication device, wherein each of said first adapter wireless communication devices comprises:

a controller for generating a wireless data packet including the CEC message in the generated CEC frame in the generated CEC frame;

a wireless transceiver for wirelessly transmitting a wireless signal including the generated wireless data packet to said second adapter wireless communication device, and for receiving a wireless signal including a wireless receiving response packet and wirelessly transmitted from said second adapter wireless communication device in response to the wireless data packet in the wirelessly-transmitted wireless signal; and a table including CEC logical addresses of respective devices constituting the wireless communication system;

wherein a header block of the CEC frame from the AV device is inputted to the controller, and the controller determines whether or not a destination logical address included in the header block is registered in the table, and wherein, when the destination logical address is not registered in the table, the controller completes a process without outputting a predetermined acknowledge signal to the AV device.

23. A method of controlling an adapter wireless communication device of a first adapter wireless communication device for use in a wireless communication system, said wireless communication system including a plurality of adapter wireless communication devices for transmitting and receiving a CEC (Consumer Electronics Control) message specified in an HDMI (High-Definition Multimedia Interface) standard and included in a CEC frame generated by an AV device, said plurality of wireless communication devices including said first adapter wireless communication device and a second adapter wireless communication device, the method includes the following steps of:

generating a wireless data packet including the CEC message in the generated CEC frame:

wirelessly transmitting a wireless signal including the generated wireless data packet to said second adapter wireless communication device, and receiving a wireless signal including a wireless receiving response packet and wirelessly transmitted from said second adapter wireless communication device in response to the wireless data packet in the wirelessly-transmitted wireless signal;

when a header block of the CEC frame from the AV device is inputted, determining whether or not a destination logical addresses included in the header block is registered in a table including CEC logical addresses of respective devices constituting the wireless communication system; and wherein, when the destination logical address is not registered in the table, completing a process without outputting a predetermined acknowledge signal to the AV device.

* * * * *